(12) United States Patent
Zheng et al.

(10) Patent No.: US 12,555,851 B2
(45) Date of Patent: Feb. 17, 2026

(54) LOWER PLASTIC MEMBER, END COVER ASSEMBLY, ENERGY STORAGE APPARATUS, AND POWER CONSUMING DEVICE

(71) Applicant: XIAMEN HITHIUM ENERGY STORAGE TECHNOLOGY CO., LTD., Fujian (CN)

(72) Inventors: Jianming Zheng, Fujian (CN); Hepan Xiao, Fujian (CN)

(73) Assignee: XIAMEN HITHIUM ENERGY STORAGE TECHNOLOGY CO., LTD., Fujian (CN)

( * ) Notice: Subject to any disclaimer, the term of this patent is extended or adjusted under 35 U.S.C. 154(b) by 0 days.

(21) Appl. No.: 19/070,516

(22) Filed: Mar. 4, 2025

(65) Prior Publication Data

US 2025/0286178 A1    Sep. 11, 2025

(30) Foreign Application Priority Data

Mar. 6, 2024   (CN) .......................... 202410253862.9

(51) Int. Cl.
*H01M 50/15* (2021.01)
*H01M 10/04* (2006.01)
(Continued)

(52) U.S. Cl.
CPC ........... *H01M 50/15* (2021.01); *H01M 10/04* (2013.01); *H01M 50/16* (2021.01);
(Continued)

(58) Field of Classification Search
CPC .. H01M 50/15; H01M 50/176; H01M 50/394; H01M 50/3425; H01M 50/16; H01M 10/04
See application file for complete search history.

(56) References Cited

FOREIGN PATENT DOCUMENTS

| CN | 102416690 | 4/2012 |
| CN | 218182335 | 12/2022 |

(Continued)

OTHER PUBLICATIONS

CN 116565480 English Translation (Year: 2023).*
(Continued)

*Primary Examiner* — Jimmy Vo
(74) *Attorney, Agent, or Firm* — Hodgson Russ LLP

(57) ABSTRACT

A lower plastic member, an end cover assembly, an energy storage apparatus, and a power consuming device are provided. The lower plastic member includes a body and a suction portion. The body has a first surface and a second surface. The first surface is configured to be positioned at one side of the body facing towards an upper cover. The suction portion is disposed on the first surface. The suction portion includes multiple first ribs and multiple second ribs. The multiple first ribs are parallel to and spaced apart from one another. The multiple second ribs are parallel to and spaced apart from one another. The multiple first ribs and the multiple second ribs are disposed in a crisscross pattern. The multiple first ribs and the multiple second ribs cooperatively define multiple recesses. Each of the multiple recesses is recessed from the first surface towards the second surface.

20 Claims, 9 Drawing Sheets

(51) Int. Cl.
*H01M 50/16* (2021.01)
*H01M 50/176* (2021.01)
*H01M 50/30* (2021.01)
*H01M 50/342* (2021.01)

(52) U.S. Cl.
CPC ..... *H01M 50/176* (2021.01); *H01M 50/3425* (2021.01); *H01M 50/394* (2021.01)

(56) References Cited

FOREIGN PATENT DOCUMENTS

| | | | | |
|---|---|---|---|---|
| CN | 115807813 | A * | 3/2023 | |
| CN | 116365123 | | 6/2023 | |
| CN | 116365126 | | 6/2023 | |
| CN | 116365175 | | 7/2023 | |
| CN | 116409579 | A * | 7/2023 | ............. B65G 23/44 |
| CN | 116565480 | | 8/2023 | |
| CN | 116581467 | | 10/2023 | |
| CN | 116914335 | | 10/2023 | |
| CN | 116799447 | | 11/2023 | |
| CN | 117219933 | | 12/2023 | |
| EP | 1018420 | A1 * | 7/2000 | ......... B29C 45/2618 |
| EP | 3907780 | A1 * | 11/2021 | .......... H01M 50/296 |
| EP | 4510377 | | 2/2025 | |
| WO | 2023220880 | | 11/2023 | |
| WO | 2024022155 | | 2/2024 | |

OTHER PUBLICATIONS

CN 115807813 English Translation (Year: 2023).*
CN 116409579 English Translation (Year: 2023).*
CN 116565480 English Tranlation (Year: 2023).*
Covestro, "Snap Fit Joints for Plastics", 2015 (Year: 2015).*
EP 1018420 English Translation (Year: 2000).*
EP 3907780 (Year: 2021).*
WIPO, International Search Report and Written Opinion for International Application No. PCT/CN2024/137072, Feb. 19, 2025.
CNIPA, First Office Action for CN Application No. 202410253862.9, Apr. 10, 2024.
CNIPA, Notification to Grant Patent Right for Invention for CN Application No. 202410253862.9, May 8, 2024.
Zhou et al., "The generation mechanism of demolding force based on the mold-part interface contact mode in micro-injection molding," Polymer Engineering & Science, Jan. 2023, vol. 63, No. 3.
EPO, Extended European Search Report for EP Application No. 25161664.5, Sep. 18, 2025.

* cited by examiner

LOWER PLASTIC MEMBER, END COVER ASSEMBLY, ENERGY STORAGE APPARATUS, AND POWER CONSUMING DEVICE

CROSS-REFERENCE TO RELATED APPLICATIONS

This application claims priority to Chinese Patent Application No. 202410253862.9, filed Mar. 6, 2024, the entire disclosure of which is incorporated herein by reference.

TECHNICAL FIELD

This disclosure relates to the field of energy storage technology, and in particular to a lower plastic member, an end cover assembly, an energy storage apparatus, and a power consuming device.

BACKGROUND

Secondary batteries, also known as rechargeable batteries or storage batteries, refer to batteries that can be reused after active materials thereof are reactivated through charging following discharge. With the recyclable characteristics of the secondary battery, the secondary battery gradually becomes a main power source of a power consuming device. With the increasing demand of the secondary battery, people have higher and higher performance requirements for the secondary battery in various aspects, especially for the energy density per unit volume of the battery. The thickness of an end cover assembly of the battery is an important parameter affecting the energy density per unit volume of battery, and an excessively thick end cover assembly may reduce the energy density per unit volume of the battery. At present, the end cover assembly includes a lower plastic member used for insulation between an upper cover and a terminal. In order to improve the energy density per unit volume of the battery, the lower plastic member is usually designed to be very thin.

SUMMARY

In a first aspect, a lower plastic member for an end cover assembly of an energy storage apparatus is provided in the present disclosure. The lower plastic member includes a body, a suction portion, and an explosion-proof boss. The body has a first surface and a second surface positioned facing away from the first surface. The first surface is configured to be positioned at one side of the body facing towards an upper cover. The suction portion is disposed on the first surface. The suction portion includes multiple first ribs and multiple second ribs. The multiple first ribs are parallel to and spaced apart from one another. The multiple second ribs are parallel to and spaced apart from one another. The multiple first ribs and the multiple second ribs are disposed in a crisscross pattern. The multiple first ribs and the multiple second ribs cooperatively define multiple recesses. Each of the multiple recesses is recessed from the first surface towards the second surface. The explosion-proof boss is disposed at a middle part of the body in a length direction of the body. The explosion-proof boss is recessed relative to the first surface and protrudes relative to the second surface. The explosion-proof boss is configured to be aligned with an explosion-proof valve disposed on the upper cover. A midline extending in a width direction of the first surface is corresponding to the explosion-proof boss. There is a spacing distance between the suction portion and the explosion-proof boss. An end surface of the multiple first ribs configured to be positioned facing towards the upper cover is flush with the first surface. An end surface of the multiple second ribs configured to be positioned facing towards the upper cover is flush with the first surface. An orthographic projection of the suction portion on the first surface is circular and has a diameter ranging from 5 mm to 10 mm. An orthographic projection of each of the multiple recesses on the first surface is rectangular, and has a length ranging from 0.3 mm to 0.6 mm and a width ranging from 0.3 mm to 0.6 mm. A depth of each of the multiple recesses recessed from the first surface ranges from 0.2 mm to 0.3 mm. The suction portion is implemented as multiple suction portions. The multiple suction portions are symmetrical about the midline extending in the width direction of the first surface. The multiple suction portions are arranged symmetrically about a second midline.

In a second aspect, an end cover assembly is further provided in the present disclosure. The end cover assembly includes an upper cover and a lower plastic member. The lower plastic member includes a body, a suction portion, and an explosion-proof boss. The body has a first surface and a second surface positioned facing away from the first surface. The first surface of the lower plastic member is positioned facing towards the upper cover. The suction portion is disposed on the first surface. The suction portion includes multiple first ribs and multiple second ribs. The multiple first ribs are parallel to and spaced apart from one another. The multiple second ribs are parallel to and spaced apart from one another. The multiple first ribs and the multiple second ribs are disposed in a crisscross pattern. The multiple first ribs and the multiple second ribs cooperatively define multiple recesses. Each of the multiple recesses is recessed from the first surface towards the second surface. The explosion-proof boss is disposed at a middle part of the body in a length direction of the body. The explosion-proof boss is recessed relative to the first surface and protrudes relative to the second surface. The explosion-proof boss is aligned with an explosion-proof valve disposed on the upper cover. A midline extending in a width direction of the first surface is corresponding to the explosion-proof boss. There is a spacing distance between the suction portion and the explosion-proof boss. An end surface of the multiple first ribs positioned facing towards the upper cover is flush with the first surface. An end surface of the multiple second ribs positioned facing towards the upper cover is flush with the first surface. An orthographic projection of the suction portion on the first surface is circular and has a diameter ranging from 5 mm to 10 mm. An orthographic projection of each of the multiple recesses on the first surface is rectangular, and has a length ranging from 0.3 mm to 0.6 mm and a width ranging from 0.3 mm to 0.6 mm. A depth of each of the multiple recesses recessed from the first surface ranges from 0.2 mm to 0.3 mm. The suction portion is implemented as multiple suction portions. The multiple suction portions are symmetrical about the midline extending in the width direction of the first surface. The multiple suction portions are arranged symmetrically about a second midline.

In a third aspect, a power consuming device is further provided in the present disclosure. The power consuming device includes a power consuming apparatus and an energy storage apparatus. The energy storage apparatus is configured to supply power to the power consuming apparatus. The energy storage apparatus includes a housing, a cell assembly, and an end cover assembly. The cell assembly is disposed in the housing. The end cover assembly is connected to the housing. The end cover assembly includes an upper cover and a lower plastic member. The lower plastic member includes a body, a suction portion, and an explosion-proof boss. The body has a first surface and a second surface positioned facing away from the first surface. The first surface of the lower plastic member is positioned facing towards the upper cover. The suction portion is disposed on the first surface. The suction portion includes multiple first ribs and multiple second ribs. The multiple first ribs are parallel to and spaced apart from one another. The multiple second ribs are parallel to and spaced apart from one another. The multiple first ribs and the multiple second ribs are disposed in a crisscross pattern. The multiple first ribs and the multiple second ribs cooperatively define multiple recesses. Each of the multiple recesses is recessed from the first surface towards the second surface. The explosion-proof boss is disposed at a middle part of the body in a length direction of the body. The explosion-proof boss is recessed relative to the first surface and protrudes relative to the second surface. The explosion-proof boss is aligned with an explosion-proof valve disposed on the upper cover. A midline extending in a width direction of the first surface is corresponding to the explosion-proof boss. There is a spacing distance between the suction portion and the explosion-proof boss. An end surface of the multiple first ribs positioned facing towards the upper cover is flush with the first surface. An end surface of the multiple second ribs positioned facing towards the upper cover is flush with the first surface. An orthographic projection of the suction portion on the first surface is circular and has a diameter ranging from 5 mm to 10 mm. An orthographic projection of each of the multiple recesses on the first surface is rectangular, and has a length ranging from 0.3 mm to 0.6 mm and a width ranging from 0.3 mm to 0.6 mm. A depth of each of the multiple recesses recessed from the first surface ranges from 0.2 mm to 0.3 mm. The suction portion is implemented as multiple suction portions. The multiple suction portions are symmetrical about the midline extending in the width direction of the first surface. The multiple suction portions are arranged symmetrically about a second midline.

BRIEF DESCRIPTION OF THE DRAWINGS

To more clearly describe implementations in the present disclosure or technical solutions in related art, the accompanying drawings that need to be used in description of implementations or the related art will be briefly introduced below. Apparently, the accompanying drawings in the following description are only some implementations in the present disclosure, and those of ordinary skill in the art may also obtain other accompanying drawings based on these accompanying drawings without creative effort.

Figure 1:
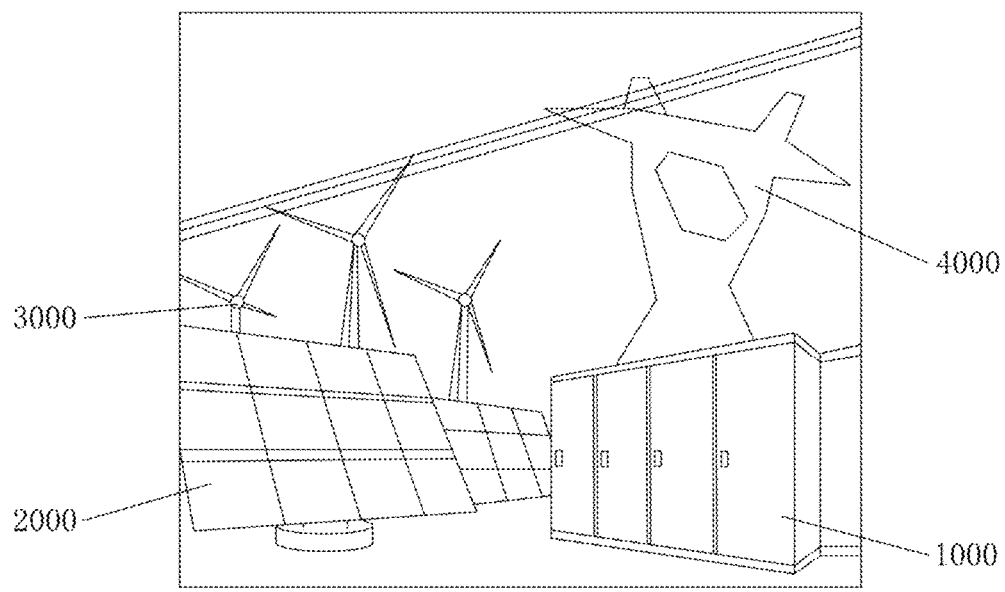
FIG. 1 is a view of an application scenarios of an energy storage apparatus according to an embodiment.

Description of reference signs of the accompanying drawings: 1000—energy storage apparatus, 2000—photovoltaic panel, 3000—wind turbine, 4000—power grid, 10—lower plastic member, 101—gate portion, 11—body, 111—first surface, 112—second surface, 12—suction portion, 121—recess, 122—first rib, 123—second rib, 13—code portion, 14—terminal boss, 141—first terminal boss, 142—first terminal-hole, 143—first terminal-groove, 144—second terminal boss, 146—second terminal-hole, 147—avoidance notch, 15—snap-fit, 151—extension portion, 152—protrusion, 16—slider portion, 171—annular push portion, 172—first push-point portion, 173—second push-point portion, 174—third push-point portion, 18—explosion-proof boss, 181—first boss, 182—third surface, 183—vent hole, 184—second boss, 185—fourth surface, 186—air-permeable hole, 191—first recessed platform, 192—fifth surface, 193—first leakage hole, 194—second recessed platform, 195—sixth surface, 196—second leakage hole, 197—first reinforcing rib, 198—second reinforcing rib, 201—mold-mating plane, 21—first mold, 211—first molding surface, 212—first molding groove, 213—push hole, 22—second mold, 221—second molding surface, 222—second molding groove, 223—butting portion, 224—butting surface, 225—pouring hole, A1—first midline, A2—second midline, X—first direction, Y—second direction, Z—third direction, 20—upper cover, 23—explosion-proof valve, 100—end cover assembly, 200—housing, 300—cell assembly, 1100—power consuming apparatus, 5000—power consuming device.

DETAILED DESCRIPTION

Technical solutions of implementations in the present disclosure will be described clearly and completely below with reference to accompanying drawings in implementations of the present disclosure. Apparently, implementations described herein are merely some implementations, rather than all implementations, of the present disclosure. Based on implementations of the present disclosure, all other implementations obtained by those of ordinary skill in the art without creative effort shall fall within the protection scope of the present disclosure.

It may be noted that when an assembly is referred to as "fixed to" another assembly, the assembly may be directly positioned on the other assembly or an intermediate assembly may exist therebetween. When an assembly is referred to as "connected to" another assembly, the assembly may be directly connected to the other assembly or an intermediate assembly may exist therebetween simultaneously.

Unless otherwise defined, all technical and scientific terms used in the present disclosure have the same meaning as commonly understood by those skilled in the art of the present disclosure. The terms used in the detailed description in the present disclosure are for the purpose of describing specific embodiments only and are not intended to limit the present disclosure. The term "and/or" in the present disclosure includes any and all combinations of one or more related listed items.

The following will describe in detail some implementations of the present disclosure with reference to the accompanying drawings. Various embodiments and features therein may be implemented in any combination with each other without conflict.

At present, the lower plastic member is manufactured by using an injection molding process. During demolding, the lower plastic member is easily damaged due to pulling of a mold, and the product yield is low.

The present disclosure aims to provide a lower plastic member, an end cover assembly, an energy storage apparatus, and a power consuming device. Therefore, a problem, that the lower plastic member is easily damaged due to pulling of a mold during demolding, is solved.

In order to realize the purpose of the present disclosure, the present disclosure provides the following technical solution.

In a first aspect, a lower plastic member for an end cover assembly of an energy storage apparatus is provided in the present disclosure. The lower plastic member includes a body, a suction portion, and an explosion-proof boss. The body has a first surface and a second surface positioned facing away from the first surface. The first surface is configured to be positioned at one side of the body facing towards an upper cover. The suction portion is disposed on the first surface. The suction portion includes multiple first ribs and multiple second ribs. The multiple first ribs are parallel to and spaced apart from one another. The multiple second ribs are parallel to and spaced apart from one another. The multiple first ribs and the multiple second ribs are disposed in a crisscross pattern. The multiple first ribs and the multiple second ribs cooperatively define multiple recesses. Each of the multiple recesses is recessed from the first surface towards the second surface. The explosion-proof boss is disposed at a middle part of the body in a length direction of the body. The explosion-proof boss is recessed relative to the first surface and protrudes relative to the second surface. The explosion-proof boss is configured to be aligned with an explosion-proof valve disposed on the upper cover. A midline extending in a width direction of the first surface is corresponding to the explosion-proof boss. There is a spacing distance between the suction portion and the explosion-proof boss. An end surface of the multiple first ribs configured to be positioned facing towards the upper cover is flush with the first surface. An end surface of the multiple second ribs configured to be positioned facing towards the upper cover is flush with the first surface. An orthographic projection of the suction portion on the first surface is circular and has a diameter ranging from 5 mm to 10 mm. An orthographic projection of each of the multiple recesses on the first surface is rectangular, and has a length ranging from 0.3 mm to 0.6 mm and a width ranging from 0.3 mm to 0.6 mm. A depth of each of the multiple recesses recessed from the first surface ranges from 0.2 mm to 0.3 mm. The suction portion is implemented as multiple suction portions. The multiple suction portions are symmetrical about the midline extending in the width direction of the first surface. The multiple suction portions are arranged symmetrically about a second midline.

In the lower plastic member provided in the present disclosure, the suction portion is provided, and the suction portion is disposed on the first surface and has the recesses recessed from the first surface towards the second surface. During demolding of the mold, the recesses form an effect like a suction cup, so that the suction force between the lower plastic member and a first mold can be increased. A pulling force of a second mold on the lower plastic member is insufficient to separate the lower plastic member from the first mold, thereby avoiding damage to the lower plastic member and improving product yield. The multiple first ribs and the multiple second ribs are disposed to define the multiple recesses. Compared to a single recess with a relatively large size, the multiple dense recesses with relatively small size can have a more stable effect on increasing the suction force with the mold, and have a better effect on avoiding the damage to the lower plastic member and improving the product yield. By setting each dimension of the above suction portion, the suction force between the lower plastic member and the mold can be increased, and the damage to the lower plastic member caused by the bending and deformation of the lower plastic member can be avoided. In addition, the structure is simple, the manufacturing is convenient, and the cost is low. The multiple suction portions symmetrically arranged feature a simple layout, thereby facilitating the mold manufacturing and also facilitating visual recognition during the subsequent assembly of the end cover assembly.

In an implementation, an end portion of each of the multiple first ribs and the multiple second ribs, configured to be positioned facing towards the upper cover, has a pointed-prism shape.

In an implementation, at least two of the multiple suction portions are disposed on a same side of the midline extending in the width direction of the first surface, and have different distances from the midline extending in the width direction of the first surface. This arrangement of the multiple suction portions provides a foolproof function for machine vision recognition in automated production lines during the assembly of the end cover assembly, thereby preventing the lower plastic member from being placed incorrectly in a reversed left-right orientation.

In an implementation, the first surface is provided with a code portion. The code portion has a preset shape. The preset shape includes at least one of a number, a letter, a bar code, or a two-dimensional code. By providing the code portion, which can be recognized with the naked eye or recognized by scanning the code, the product category, production date, manufacturer name, and other characteristics of the lower plastic member can be obtained, thereby facilitating the traceability of the lower plastic member, and the control of the production process and the traceability of quality issues.

In an implementation, the code portion is implemented as multiple code portions arranged side by side. By arranging the multiple code portions side by side, different kinds of information can be displayed or recognized in one position, which is convenient for tracing various kinds of information.

In an implementation, any adjacent two of the multiple code portions are spaced apart from each other. During demolding, after the second mold is separated from the first mold and the lower plastic member, the lower plastic member needs to be separated from the first mold. The multiple code portions correspond to multiple replaceable code blocks on the first mold. By providing a gap between any two adjacent code portions, or in other words, between any two adjacent movable code portions, air can enter the gap during demolding. Therefore, the local negative pressure between the replaceable code blocks and the lower plastic member is avoided, the demolding resistance between the lower plastic member and the first mold is reduced, and the production efficiency is improved.

In an implementation, the lower plastic member further includes a terminal boss. The terminal boss is connected to the body and protrudes from the first surface. A snap-fit is provided at each of the two sides of the terminal boss in the width direction of the first surface. By providing the snap-fit at each of the two sides of the terminal boss in a second direction, the snap-in connection between the lower plastic member and the upper cover can be effected through the snap-fit, and the connection stability between the lower plastic member and the upper cover can be improved.

In an implementation, the snap-fit includes an extension portion and a protrusion. The extension portion has one end connected to the first surface and extends in a direction away from the second surface. The protrusion is disposed at another end of the extension portion away from the body and protrudes from a surface of the extension portion positioned facing away from the terminal boss. With this snap-fit structure, the protrusion and the terminal boss are positioned facing away from each other in the second direction, allowing for easy snap-in connection between the snap-fit and the upper cover.

In an implementation, the lower plastic member further includes a slider portion. The slider portion is disposed on the first surface and located at one side of the extension portion positioned facing away from the terminal boss. The slider portion is configured to allow a slider to slide on the first surface. By providing the slider portion, it is possible to avoid difficulty in demolding or damage to the snap-fit during demolding.

In an implementation, the lower plastic member further includes an annular push portion. The annular push portion is disposed on the first surface and surrounds the terminal boss. The annular push portion is connected to or spaced apart from the slider portion. In this way, the force can be uniformly applied to the complex terminal boss, thereby ensuring that the terminal boss can be better demolded and avoiding damage.

In an implementation, the lower plastic member further includes multiple first push-point portions. The multiple first push-point portions are disposed on the first surface and spaced apart from one another. By arranging the multiple first push-point portions spaced apart from one another on the first surface, the force can be uniformly applied to the first surface, thereby facilitating demolding, and preventing the lower plastic member from being damaged due to local uneven stress.

In an implementation, a bottom wall of the explosion-proof boss recessed from the first surface is a third surface. The third surface defines a vent hole. Each of the first surface and the third surface is provided with multiple second push-point portions spaced apart from one another. By arranging the multiple second push-point portions spaced apart from one another on each of the first surface and the third surface, the force can be uniformly applied to each of the first surface and the third surface, thereby facilitating demolding, and preventing the lower plastic member from being damaged due to local uneven stress.

In an implementation, a midline extending in a length direction of the first surface is a first midline. A midline extending in the width direction of the first surface is a second midline. The multiple first push-point portions are symmetrical about each of the first midline and the second midline, and/or the multiple second push-point portions are symmetrical about each of the first midline and the second midline. In this way, the multiple first push-point portions can apply force to the lower plastic member more uniformly, and the lower plastic member is not easily deformed during demolding. Similarly, the multiple second push-point portions can apply force to the lower plastic member more uniformly, and the lower plastic member is not easily deformed during demolding.

In an implementation, the explosion-proof boss includes a first boss and two second bosses. The first boss is disposed at a middle part of the first surface in the width direction of the first surface. Two ends of the first boss in the width direction of the first surface are connected to the two second bosses, respectively. A depth of the first boss recessed relative to the first surface is less than a depth of each second boss recessed relative to the first surface. A bottom wall of the first boss is the third surface. A bottom wall of the second boss recessed from the first surface is a fourth surface. The fourth surface defines multiple air-permeable holes arranged at intervals. The fourth surface is provided with multiple third push-point portions located in the intervals between the multiple air-permeable holes. With this structure of the explosion-proof boss provided, the first boss having a lower protruding height relative to the second surface is provided between the two second bosses. When mounted to the energy storage apparatus, a certain accommodating space can be defined at the first boss between the two second bosses, which is convenient to accommodate partial structures such as cell assemblies, thereby fully utilizing space and reducing the size of the energy storage apparatus. By arranging the multiple third push-point portions at intervals on the fourth surface, the force can be uniformly applied to the fourth surface, thereby facilitating demolding, and preventing the lower plastic member from being damaged due to local uneven stress.

In an implementation, the lower plastic member further includes a first recessed platform and a second recessed platform. The first recessed platform and the second recessed platform are respectively disposed at two ends of the body in the length direction of the body, and are recessed from the first surface and protrude from the second surface. A bottom wall of the first recessed platform recessed from the first surface is a fifth surface. A bottom wall of the second recessed platform recessed from the first surface is a sixth surface. Each of the fifth surface and the sixth surface defines multiple leakage holes arranged at intervals. Each of the fifth surface and the sixth surface is provided with multiple third push-point portions located in the intervals between the multiple leakage holes. By providing the first recessed platform and the second recessed platform, a top surface of each of the first recessed platform and the second recessed platform protruding from the second surface can be configured to be in contact with the cell assembly, so that there is a certain space between the body and the cell assembly, thereby facilitating accommodation of structures such as a tab. Therefore, the space utilization rate of the energy storage apparatus is increased and the size of the energy storage apparatus is reduced. By arranging the multiple third push-point portions at intervals on each of the fifth surface and the sixth surface, the force can be uniformly applied to each of the fifth surface and the sixth surface, thereby facilitating demolding, and preventing the lower plastic member from being damaged due to local uneven stress.

In an implementation, each of the multiple first push-point portions is crater-shaped. A middle part of each of the multiple first push-point portions is recessed relative to the first surface. A peripheral edge of each of the multiple first push-point portions protrudes relative to the first surface. By providing the first push-point portion having this shape, demolding can be performed at a higher temperature than room temperature, thereby improving production efficiency.

In an implementation, the lower plastic member further includes a gate portion. The gate portion is located at one side of the second surface positioned facing away from the first surface. The gate portion is residually formed during injection molding of the lower plastic member. By forming the gate portion at the side of the second surface positioned facing away from the first surface, the first mold is configured for demolding by the push rod, and the second mold is configured for pouring of the plastic liquid, so that the function of the first mold is independent from the function of the second mold. Therefore, misoperation, which is easily caused by performing the pouring of the plastic liquid and the demolding by the push rod on the same mold at the same time, can be avoided, and then adverse effects caused by the misoperation can be avoided.

In an implementation, the lower plastic member further includes a first recessed platform, and a second recessed platform. The explosion-proof boss is disposed at a middle part of the body in the length direction of the body. The first recessed platform and the second recessed platform are respectively disposed at two ends of the body in the length direction of the body. Each of the explosion-proof boss, the first recessed platform, and the second recessed platform is recessed from the first surface and protrudes from the second surface. A top surface of each of the explosion-proof boss, the first recessed platform, and the second recessed platform, protruding from the second surface, is provided with the gate portion. By providing the gate portion, the injection molding process can be conveniently carried out, interference with the demolding operation can be avoided, and the product yield can be ensured.

In a second aspect, an end cover assembly is further provided in the present disclosure. The end cover assembly includes an upper cover and a lower plastic member. The lower plastic member includes a body, a suction portion, and an explosion-proof boss. The body has a first surface and a second surface positioned facing away from the first surface. The first surface of the lower plastic member is positioned facing towards the upper cover. The suction portion is disposed on the first surface. The suction portion includes multiple first ribs and multiple second ribs. The multiple first ribs are parallel to and spaced apart from one another. The multiple second ribs are parallel to and spaced apart from one another. The multiple first ribs and the multiple second ribs are disposed in a crisscross pattern. The multiple first ribs and the multiple second ribs cooperatively define multiple recesses. Each of the multiple recesses is recessed from the first surface towards the second surface. The explosion-proof boss is disposed at a middle part of the body in a length direction of the body. The explosion-proof boss is recessed relative to the first surface and protrudes relative to the second surface. The explosion-proof boss is aligned with an explosion-proof valve disposed on the upper cover. A midline extending in a width direction of the first surface is corresponding to the explosion-proof boss. There is a spacing distance between the suction portion and the explosion-proof boss. An end surface of the multiple first ribs positioned facing towards the upper cover is flush with the first surface. An end surface of the multiple second ribs positioned facing towards the upper cover is flush with the first surface. An orthographic projection of the suction portion on the first surface is circular and has a diameter ranging from 5 mm to 10 mm. An orthographic projection of each of the multiple recesses on the first surface is rectangular, and has a length ranging from 0.3 mm to 0.6 mm and a width ranging from 0.3 mm to 0.6 mm. A depth of each of the multiple recesses recessed from the first surface ranges from 0.2 mm to 0.3 mm. The suction portion is implemented as multiple suction portions. The multiple suction portions are symmetrical about the midline extending in the width direction of the first surface. The multiple suction portions are arranged symmetrically about a second midline.

In a third aspect, an energy storage apparatus is further provided in the present disclosure. The energy storage apparatus includes a housing, a cell assembly, and the end cover assembly in the second aspect. The cell assembly is disposed in the housing. The end cover assembly is connected to the housing.

In a fourth aspect, a power consuming device is further provided in the present disclosure. The power consuming device includes a power consuming apparatus and an energy storage apparatus. The energy storage apparatus is configured to supply power to the power consuming apparatus. The energy storage apparatus includes a housing, a cell assembly, and an end cover assembly. The cell assembly is disposed in the housing. The end cover assembly is connected to the housing. The end cover assembly includes an upper cover and a lower plastic member. The lower plastic member includes a body, a suction portion, and an explosion-proof boss. The body has a first surface and a second surface positioned facing away from the first surface. The first surface of the lower plastic member is positioned facing towards the upper cover. The suction portion is disposed on the first surface. The suction portion includes multiple first ribs and multiple second ribs. The multiple first ribs are parallel to and spaced apart from one another. The multiple second ribs are parallel to and spaced apart from one another. The multiple first ribs and the multiple second ribs are disposed in a crisscross pattern. The multiple first ribs and the multiple second ribs cooperatively define multiple recesses. Each of the multiple recesses is recessed from the first surface towards the second surface. The explosion-proof boss is disposed at a middle part of the body in a length direction of the body. The explosion-proof boss is recessed relative to the first surface and protrudes relative to the second surface. The explosion-proof boss is aligned with an explosion-proof valve disposed on the upper cover. A midline extending in a width direction of the first surface is corresponding to the explosion-proof boss. There is a spacing distance between the suction portion and the explosion-proof boss. An end surface of the multiple first ribs positioned facing towards the upper cover is flush with the first surface. An end surface of the multiple second ribs positioned facing towards the upper cover is flush with the first surface. An orthographic projection of the suction portion on the first surface is circular and has a diameter ranging from 5 mm to 10 mm. An orthographic projection of each of the multiple recesses on the first surface is rectangular, and has a length ranging from 0.3 mm to 0.6 mm and a width ranging from 0.3 mm to 0.6 mm. A depth of each of the multiple recesses recessed from the first surface ranges from 0.2 mm to 0.3 mm. The suction portion is implemented as multiple suction portions. The multiple suction portions are symmetrical about the midline extending in the width direction of the first surface. The multiple suction portions are arranged symmetrically about a second midline.

In the lower plastic member provided in the present disclosure, the suction portion is provided, and the suction portion is disposed on the first surface and has the recesses recessed from the first surface towards the second surface. During demolding of the mold, the recesses form an effect like the suction cup, so that the suction force between the lower plastic member and the first mold can be increased. The pulling force of the second mold on the lower plastic member is insufficient to separate the lower plastic member from the first mold, thereby avoiding damage to the lower plastic member and improving product yield. The multiple first ribs and the multiple second ribs are disposed to define the multiple recesses. Compared to the single recess with the relatively large size, the multiple dense recesses with relatively small size can have a more stable effect on increasing the suction force with the mold, and have a better effect on avoiding the damage to the lower plastic member and improving the product yield.

As illustrated in FIG. 1, an energy storage apparatus 1000 provided in an embodiment of the present disclosure is applied to an energy storage system. The energy storage system includes an energy storage apparatus 1000, an electric energy conversion apparatus (photovoltaic panel 2000), a wind energy conversion apparatus (wind turbine 3000), a power grid 4000, etc. The energy storage apparatus 1000 may serve as an energy storage cabinet, which may be mounted outdoors. Specifically, the photovoltaic panel 2000 can convert solar energy into electric energy during the electricity-price valley period. The energy storage apparatus 1000 is configured to store the electric energy and provide the electric energy to the power grid 4000 during a power-consumption peak period, or supply electricity when there is an outage/blackout in the power grid 4000. The wind energy conversion apparatus (wind turbine 3000) can convert wind energy into electric energy. The energy storage apparatus 1000 is configured to store the electric energy and provide the electric energy to the power grid during the power-consumption peak period, or supply electricity when there is an outage/blackout in the power grid. The electric energy may be transmitted using a high voltage cable.

There may be multiple energy storage apparatuses 1000, which are connected in series or in parallel. The multiple energy storage apparatuses 1000 are supported and electrically connected by means of a separating plate (not illustrated in the accompanying drawings). In this embodiment, the term "multiple" refers to two or more than two. An energy storage box may be disposed outside the energy storage apparatus 1000, and used to accommodate the energy storage apparatus 1000.

It may be understood that, the energy storage apparatus 1000 may include, but is not limited to a cell, a battery module, a battery pack, a battery system, etc. The actual application form of the energy storage apparatus 1000 provided in embodiments of the present disclosure may be, but is not limited to, the above-listed products, or may be other application forms. Embodiments of the present disclosure do not impose strict restrictions on the application form of the energy storage apparatus 1000.

Figure 10:
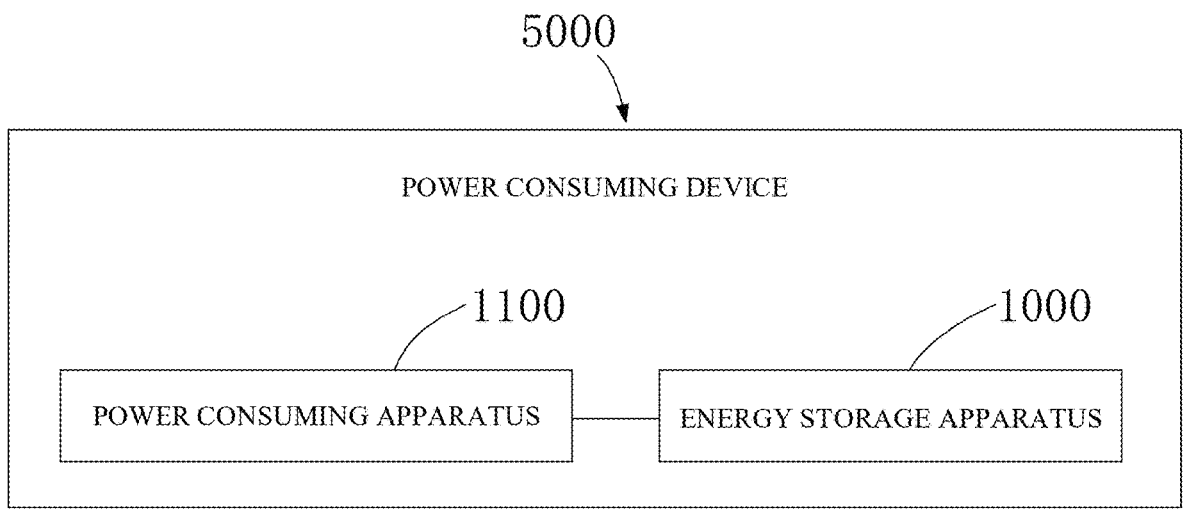
FIG. 10 is a block view of a power consuming device according to an embodiment.

As illustrated in FIG. 1 and FIG. 10, a power consuming device 5000 is provided in an embodiment of the present disclosure. The power consuming device 5000 includes a power consuming apparatus 1100 and the energy storage apparatus 1000 in embodiments of the present disclosure. The energy storage apparatus 1000 is configured to supply power to the power consuming apparatus 1100. The power consuming apparatus 1100 may be a power-generation-side power consuming apparatus, a grid-side power consuming apparatus, a base-station-side power consuming apparatus, a user-side power consuming apparatus, etc. The power consuming apparatus 1100 may specifically be various kinds of power consuming loads, which is not limited herein.

Figure 2:
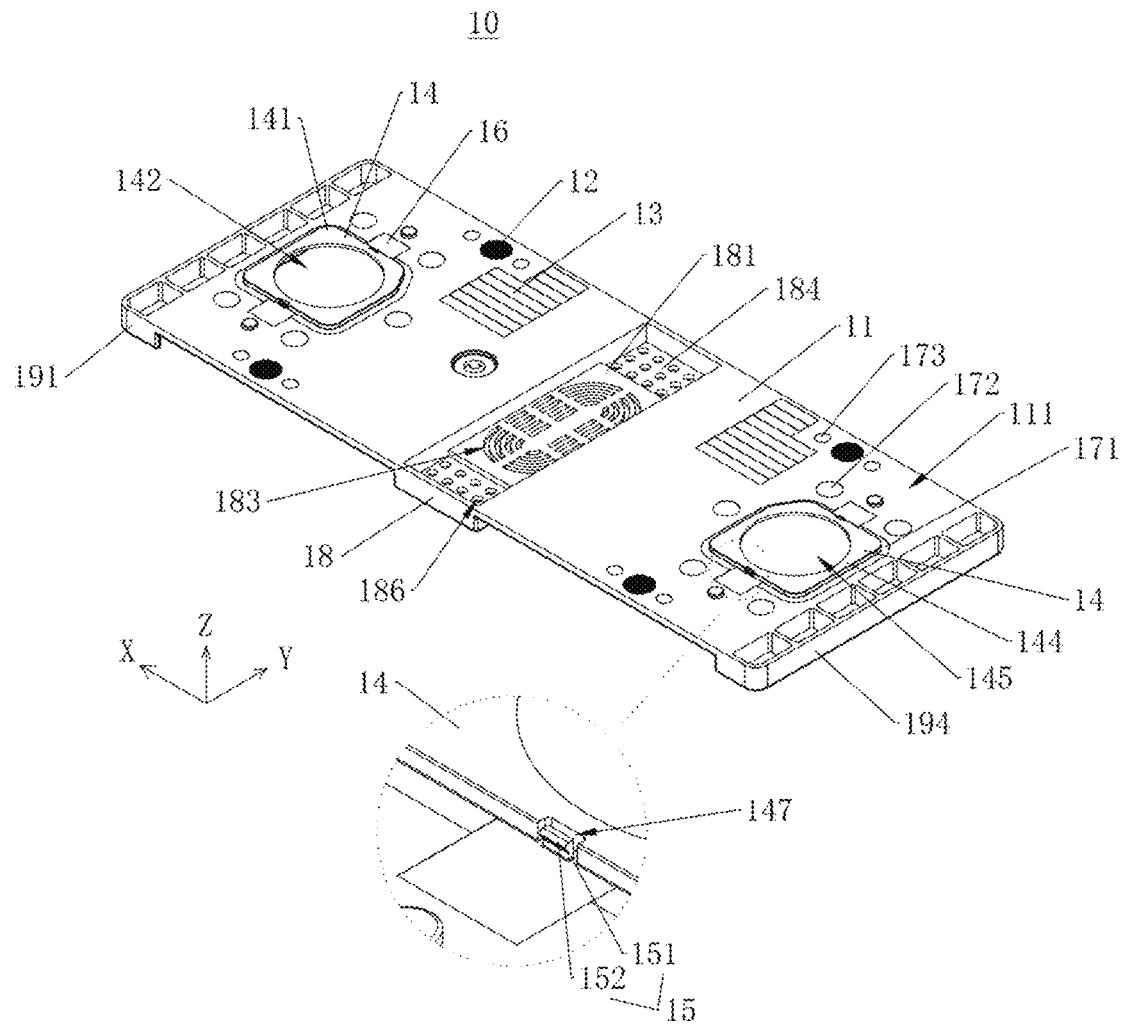
FIG. 2 is a perspective view of a lower plastic member according to an embodiment, along with a partial enlarged view thereof.
Figure 9:
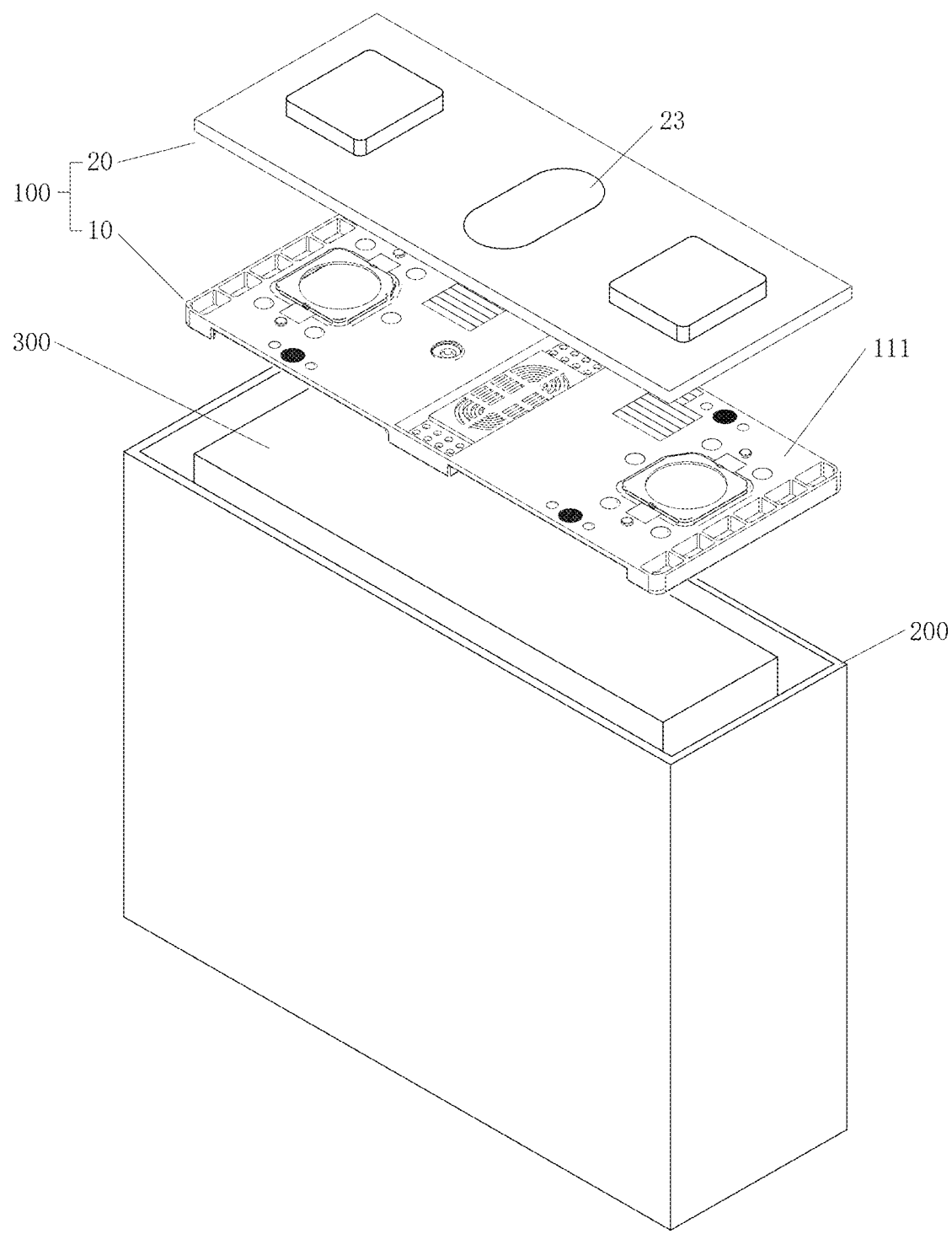
FIG. 9 is an exploded schematic view of an energy storage apparatus according to an embodiment.

As illustrated in FIG. 1, FIG. 2, and FIG. 9, an energy storage apparatus 1000 is further provided in embodiments of the present disclosure. The energy storage apparatus 1000 includes a housing 200, a cell assembly 300, and an end cover assembly 100 in any embodiment of the present disclosure. The cell assembly 300 is disposed in the housing 200 and the end cover assembly 100 is connected to the housing 200.

The housing 200 may be a square housing, and may be made of aluminum or steel, which is not limited. The housing 200 defines an accommodating space. The cell assembly 300 is accommodated in the accommodating space. The accommodating space has an opening(s) at one end or two ends of the accommodating space. The end cover assembly 100 is disposed at the opening. The end cover assembly 100 is connected and fixed to the housing 200, and close the opening. The cell assembly 300 may specifically include one or more cells connected to tab(s). The end cover assembly 100 may include an upper cover 20, a lower plastic member 10, a terminal (not shown), an explosion-proof valve 23, and the like. The lower plastic member 10 is disposed at one side of the upper cover 20 facing the cell assembly 300. The terminal passes through the lower plastic member 10 and the upper cover 20. The terminal is insulated from the upper cover 20. The terminal is connected to the tab. An external power source is connected to the terminal to charge the battery cell through the tab. The electric energy of the battery cell can also be transmitted to an external power consuming load through the tab and the terminal. The explosion-proof valve is disposed on the upper cover 20. When a large amount of gas is generated due to abnormal heat of the cell assembly 300, the explosion-proof valve can be exploded to release the gas, so as to avoid the explosion of the energy storage apparatus.

As illustrated in FIG. 2 and FIG. 9, an end cover assembly 100 is further provided in embodiments of the present disclosure. The end cover assembly 100 includes an upper cover 20 and the lower plastic member 10 in any embodiment of the present disclosure. A first surface 111 of the lower plastic member 10 faces the upper cover 20. The end cover assembly 100 can be referred to above, and is not limited herein.

The lower plastic member 10 in embodiments of the present disclosure will be introduced in detail below.

Figure 3:
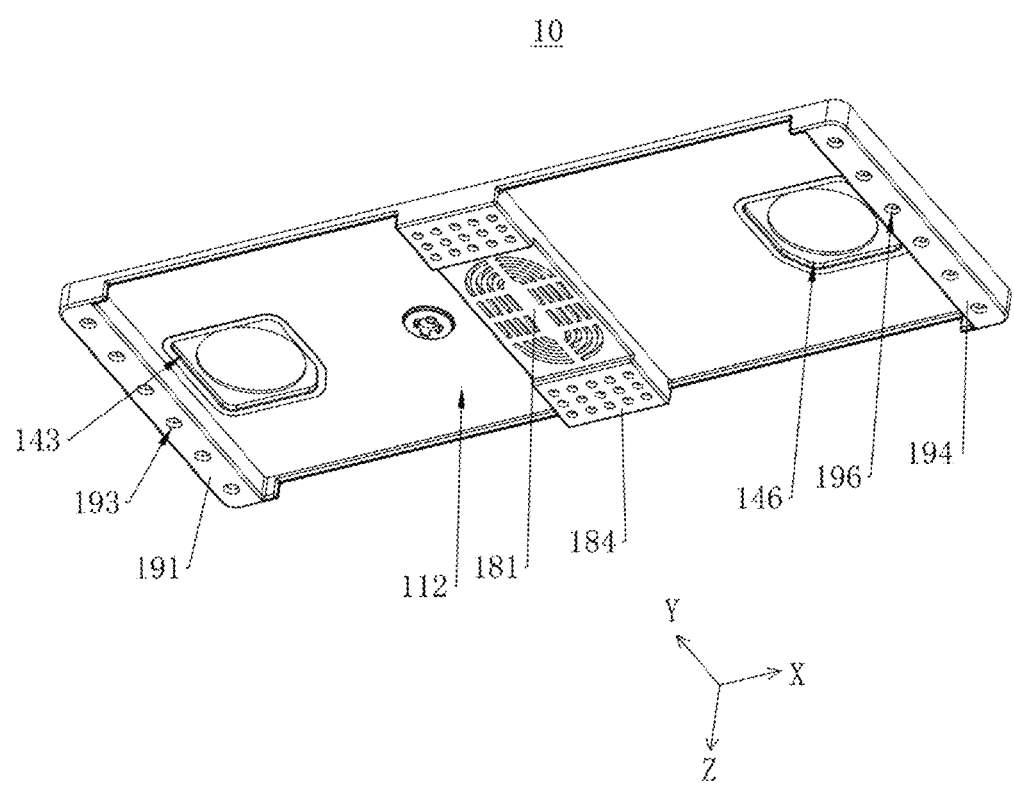
FIG. 3 is a perspective view of a lower plastic member according to an embodiment, viewed from another direction.

As illustrated in FIG. 2 and FIG. 3, the lower plastic member 10 is provided in embodiments of the present disclosure. The lower plastic member 10 includes a body 11 and a suction portion 12. The lower plastic member 10 is made by an injection molding process. Various structures of the lower plastic member 10 described below are integrated structures formed by injection molding.

The body 11 has a first surface 111 and a second surface 112 positioned facing away from the first surface 111. The first surface 111 is configured to be positioned at one side of the body 11 facing towards an upper cover. The second surface 112 is configured to be positioned at one side of the body 11 facing towards a cell assembly. The body 11 substantially has a sheet-like structure. The first surface 111 and second surface 112 are substantially flat or slightly curved, which are not limited herein. The first surface 111 and second surface 112 each are substantially rectangular.

A coordinate system is established for convenience of explanation. A first direction X is a length direction of the body 11, and is also a length direction of each of the first surface 111, the second surface 112, and the lower plastic member 10. A second direction Y is a width direction of the body 11, and is also a width direction of each of the first surface 111, the second surface 112, and the lower plastic member 10. A third direction Z is a thickness direction of the body 11, that is, a direction in which the first surface 111 and the second surface 112 that are positioned facing away from each other, and a thickness direction of the lower plastic member 10.

Figure 7:
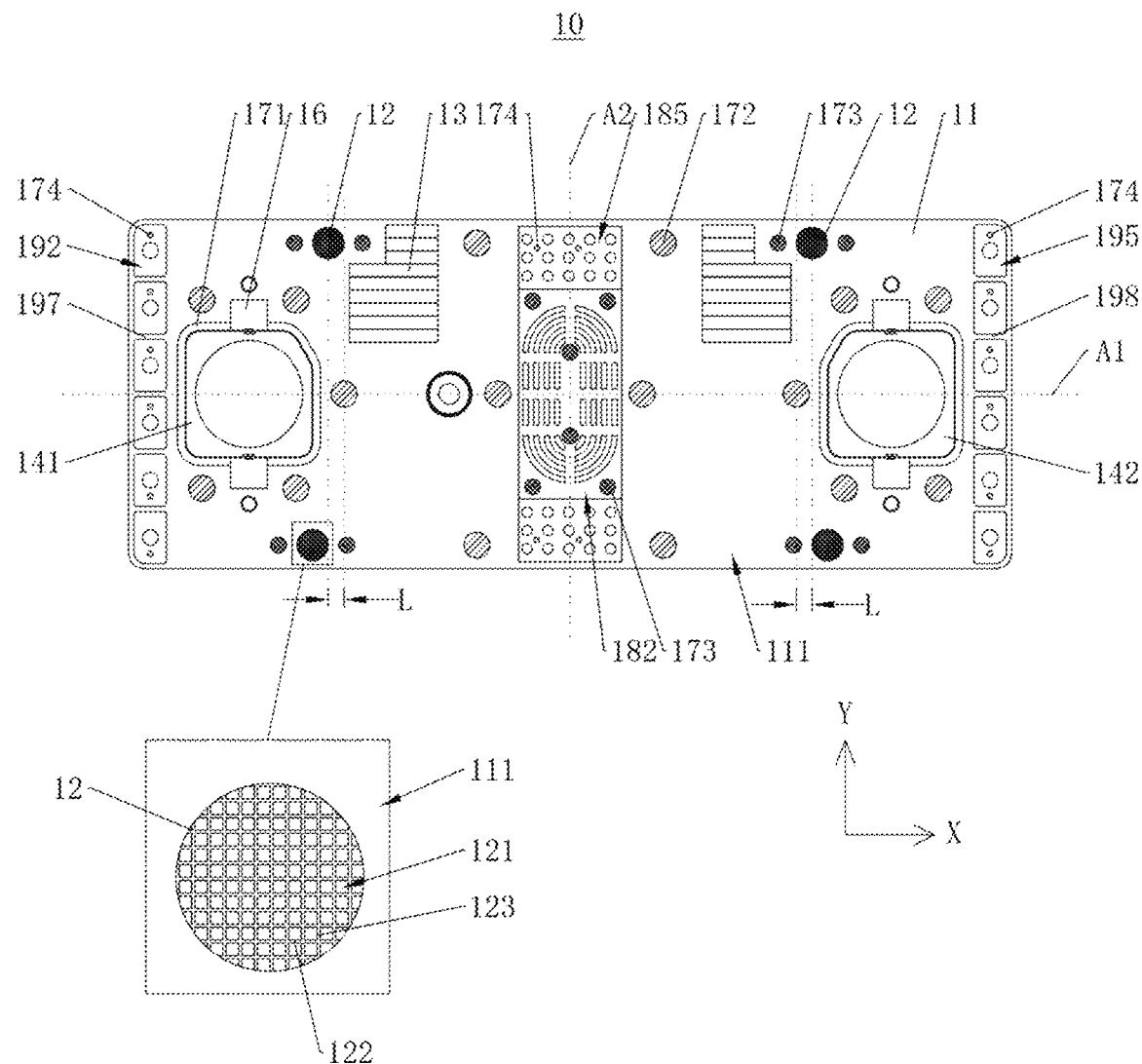
FIG. 7 is a top view of a lower plastic member according to an embodiment, along with a partial enlarged view thereof.

As illustrated in FIG. 2 and FIG. 7, the suction portion 12 is disposed on the first surface 111. The suction portion 12 has recesses 121 each recessed from the first surface 111 towards the second surface 112. Each recess 121 is slightly recessed from the first surface 111 and does not extend through the body to the second surface 112. The depth of each recess 121 is negligible with respect to the thickness of the body 11. Therefore, the presence of the recesses 121 does not affect the strength of the lower plastic member 10.

Figure 4:
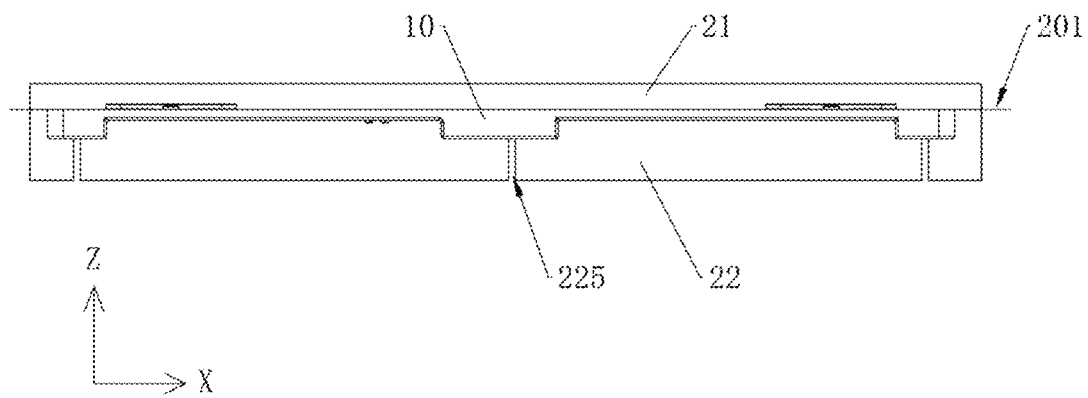
FIG. 4 is a schematic view of injection molding of a lower plastic member according to an embodiment.

As illustrated in FIG. 3 and FIG. 4, the lower plastic member 10 is formed by injection molding after the first mold 21 (fixed mold) and the second mold 22 (movable mold) are closed, and a plane where the first mold 21 and the second mold 22 are butted against each other is a mold-mating plane 201. The mold-mating plane 201 is shown by a dotted line in FIG. 4. In embodiments of the present disclosure, the first mold 21 and the second mold 22 are butted in the third direction Z (i.e., the thickness direction of the lower plastic member 10), and the mold-mating plane 201 coincides with the first surface 111. After injection molding is completed, a demolding direction is also the third direction Z.

The first mold 21 has a first molding surface 211. The first molding surface 211 is flat and extends to an edge of the first mold 21. The first mold 21 may define a recessed first molding groove 212 on the first molding surface 211. The first molding groove 212 is corresponding to a structure of the lower plastic member 10 protruding from the first surface 111. According to the quantity and different shapes of the structures of the lower plastic member 10 protruding from the first surface 111, the quantity and shape of the first molding grooves 212 can be designed adaptively, which are not specifically limited.

The second mold 22 has a second molding surface 221. The second molding surface 221 is flat, and is at a certain distance from an edge of the first mold 21 in a middle region of the first mold 21. The second mold 22 may define a recessed second molding groove 222 on the second molding surface 221. The second molding groove 222 is corresponding to a structure of the lower plastic member 10 protruding from the second surface 112. According to the quantity and different shapes of the structures of the lower plastic member 10 protruding from the second surface 112, the quantity and shape of the second molding grooves 222 can be designed adaptively, which are not specifically limited.

A butting portion 223 protruding from the second molding surface 221 is further positioned at a peripheral edge of the second mold 22. The second molding surface 221 can extend to and be connected to a side surface of the butting portion 223. A top surface of the butting portion 223 protruding from the first surface 111 is a butting surface 224. The butting surface 224 is configured to be in close contact with the first molding surface 211 of the first mold 21.

During injection molding, the first mold 21 and the second mold 22 are butted, so that the butting surface 224 is in close contact with the first molding surface 211. At this time, there is a gap between the first molding surface 211 and the second molding surface 221 to define a cavity. The first molding groove 212 and the second molding groove 222 both are in communication with the cavity to jointly form a mold cavity. Molten plastic liquid is poured into the mold cavity, and is cooled after the mold cavity is filled with the molten plastic liquid, and the lower plastic member 10 can be formed after the plastic liquid is cooled and solidified. The first molding surface 211 is configured to form the first surface 111 of the lower plastic member 10. The second molding surface 221 is configured to form the second surface 112 of the lower plastic member 10. The first molding groove 212 is configured to form the structure of the lower plastic member 10 protruding from the first surface 111. The second molding groove 222 is configured to form the structure of the lower plastic member 10 protruding from the second surface 112.

During demolding, the second mold 22 is moved away from the first mold 21 to separate the second mold 22 from the lower plastic member 10, and then the lower plastic member 10 is pushed away from the first mold 21 by a push rod (not shown) to separate the lower plastic member 10 from the first mold 21. During separation of the second mold 22 from the lower plastic member 10, the lower plastic member 10 may be pulled by the second mold 22 to a certain extent, so that the lower plastic member 10 to be separated from the first mold 21, and further the lower plastic member 10 may be locally deformed and damaged, resulting in low product yield.

In embodiments of the present disclosure, during injection molding, it is not necessary to wait for the plastic liquid to cool to room temperature before demolding, but rather, it is only necessary for the plastic liquid to solidify and mold and to be demolded at a higher temperature, so that the production efficiency can be improved. However, the plastic that is not completely cooled to room temperature may leave some marks to form specific shapes when the plastic is subjected to external force. Thanks to the optimization of injection molding process, these marks do not affect the functional realization of the lower plastic member 10, and the production efficiency can be significantly improved.

In embodiments of the present disclosure, the suction portion 12 is disposed on the first surface 111. The suction portion 12 has the recesses 121. Each recess 121 is also formed by a protruding structure (not shown) protruding from the first molding surface 211 on the first mold 21. In other words, before demolding, the protruding structure of the first mold 21 is embedded in the lower plastic member 10.

Since the suction portion 12 is a structure left after injection molding and has the recesses 121, the suction portion 12 differs significantly in shape compared to other regions of the first surface 111, so that the suction portion 12 can be easily distinguished from the other regions of the first surface 111. During the assembly of the end cover assembly, the suction portion 12 can be serve as a recognition feature for machine vision system of automated production lines, thereby facilitating quick positioning of the lower plastic member 10 and determining whether the position of the lower plastic member 10 is accurate.

In addition, after the lower plastic member 10 is assembled to form the energy storage apparatus 1000, when the electrolyte is filled into the energy storage apparatus 1000, a small amount of electrolyte spreads along a gap between the upper cover and the lower plastic member 10 and enters the above-mentioned recesses 121. Due to the surface tension of the electrolyte, the lower plastic member 10 and the upper cover can be attached together. At this time, the region where the recesses 121 are located forms a locally enclosed space and filled with electrolyte. If the lower plastic member 10 has a falling tendency (that is, when the lower plastic member 10 is about to be separated from the upper cover), the recesses 121 form a negative pressure region to resist the falling tendency of the lower plastic member 10. Since the recesses 121 are filled with electrolyte, gas can be prevented from entering and disrupting the negative pressure region. Therefore, the lower plastic member 10 is firmly attached onto a lower surface of the upper cover (that is, a surface of the upper cover positioned facing towards the lower plastic member 10), the structural strength of the end cover assembly is improved, and a Myra film welded to a sidewall of the lower plastic member 10 is prevented from being deformed.

Correspondingly, the lower surface of the upper cover of the end cover assembly (that is, a surface of the upper cover positioned facing towards the lower plastic member 10) is relatively smooth, with a surface roughness less than or equal to Ra3.2. Therefore, the first surface 111 is more tightly attached to the lower surface of the upper cover, and the negative pressure region is not easily damaged by air leakage.

Therefore, in the lower plastic member 10 provided in embodiments of the present disclosure, the suction portion 12 is provided, and the suction portion 12 is disposed on the first surface 111 and has the recesses 121 recessed from the first surface 111 towards the second surface 112. During demolding of the mold, the recesses 121 form an effect like a suction cup, so that the suction force between the lower plastic member 10 and the first mold 21 can be increased. The pulling force of the second mold 22 on the lower plastic member 10 is insufficient to separate the lower plastic member 10 from the first mold 21, thereby avoiding damage to the lower plastic member 10 and improving product yield.

In an embodiment, as illustrated in FIG. 2 and FIG. 7, the suction portion 12 includes multiple first ribs 122 and multiple second ribs 123. The multiple first ribs 122 are parallel to and spaced apart from one another. The multiple second ribs 123 are parallel to and spaced apart from one another. The multiple first ribs 122 and the multiple second ribs 123 are disposed in a crisscross pattern. The multiple first ribs 122 and the multiple second ribs 123 cooperatively define multiple recesses 121.

Optionally, each first rib 122 extends in the first direction X. Each second rib 123 extends in the second direction Y. The multiple first ribs 122 are arranged in the second direction Y at equal intervals. The multiple second ribs 123 are arranged in the first direction X at equal intervals.

Optionally, the multiple first ribs 122 may be arranged at non-equal intervals, and the multiple second ribs 123 may be arranged at non-equal intervals, all of which are not limited.

An angle defined by the intersection of each first rib 122 and each second rib 123 may be any angle other than 0°, such as 30°, 45°, 60°, 90°, etc., which is not limited.

Each of the multiple first ribs 122 and the multiple second ribs 123 may be flush with the first surface 111, or slightly protrude from the first surface 111 or be slightly recessed relative to the first surface 111, which is not limited. The thicknesses of the multiple first ribs 122 and the multiple second ribs 123 may or may not be equal, which are not limited.

Figure 5:
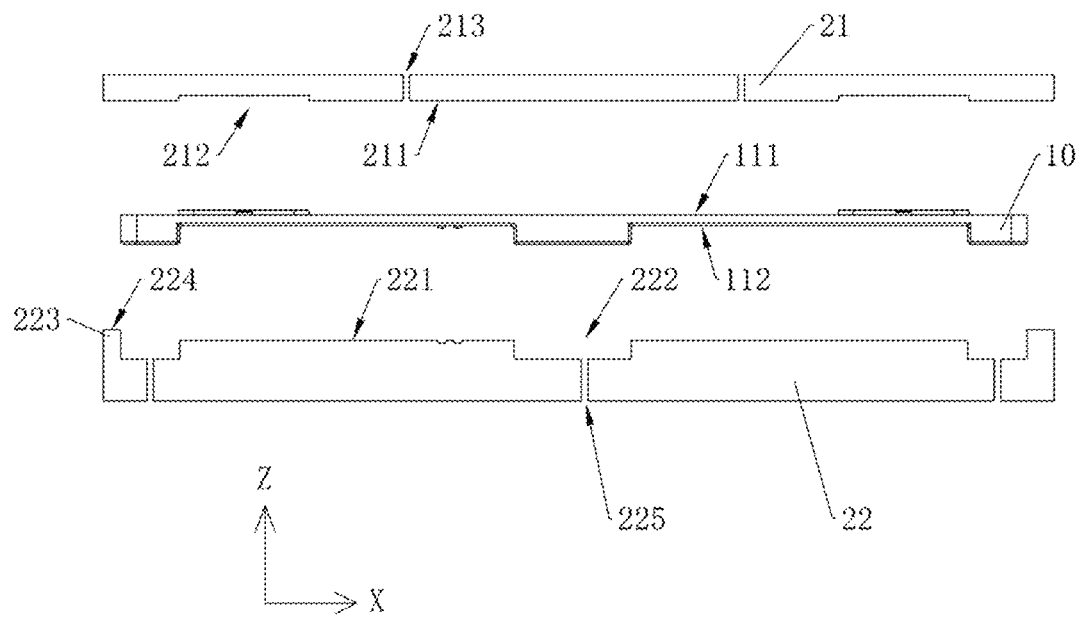
FIG. 5 is a schematic view of demolding of a lower plastic member according to an embodiment.

By providing the multiple first ribs 122 and the multiple second ribs 123 to define the multiple recesses 121, compared to a single recess 121 with a relatively large size, the multiple dense recesses 121 with relatively small size can have a more stable effect on increasing the suction force with the first mold 21 (as illustrated in FIG. 4 and FIG. 5), and have a better effect on avoiding damage to the lower plastic member 10 and improving the product yield.

Optionally, an end portion of each of the multiple first ribs 122 and the multiple second ribs 123, configured to be positioned facing towards the upper cover, has a pointed-prism shape. Specifically, the thickness of each of the multiple first ribs 122 and the multiple second ribs 123 gradually decreases from a bottom wall of each of the multiple recesses 121 towards an opening of the same.

This arrangement ensures that the size of the recess 121 at the opening is larger than the size of the recess 121 at a deeper position in a depth direction of the recess 121. In other words, the recess 121 has an outward-flared structure. The outward-flared structure of the recess 121 is related to the protruding structure provided on the first mold 21. In other words, the size of the top of the protruding structure (corresponding to the bottom wall of the recess 121) is smaller, and the size of the base of the protruding structure (corresponding to the opening of the recess 121) is larger. In this way, during demolding of the lower plastic member 10 from the first mold 21, once the lower plastic member 10 is slightly separated from the first mold 21, a gap can be defined between the protruding structure corresponding to the recess 121 on the lower plastic member 10 and the sidewall of the recess 121. Therefore, air can enter the recess 121, the first rib 122 and the second rib 123 can be prevented from always being in close contact with the protruding structure of the mold, and the relatively large negative pressure generated between the protruding structure of the first mold 21 and the recess 121 can be reduced, thereby facilitating demolding.

Optionally, as illustrated in FIG. 2 and FIG. 7, an orthographic projection of the suction portion 12 on the first surface 111 is circular and has a diameter ranging from 5 mm to 10 mm. The diameter of the suction portion 12 may be specifically 5 mm, 6 mm, 7 mm, 8 mm, 9 mm, 10 mm, etc., which is not limited. The circular suction portion 12 provided is simple in shape, so that the protruding structure, on the first molding surface 211 of the first mold 21 (as illustrated in FIG. 4 and FIG. 5), for forming the suction portion 12 is relatively easy to manufactured in shape.

Optionally, the orthographic projection of the suction portion 12 on the first surface 111 may have another shape, which is not limited.

Optionally, as illustrated in FIG. 2 and FIG. 7, an orthographic projection of each of the multiple recesses 121 on the first surface 111 is rectangular, and has a length ranging from 0.3 mm to 0.6 mm and a width ranging from 0.3 mm to 0.6 mm. The shape of the orthographic projection of the recess 121 on the first surface 111 refers to the contour shape of the peripheral sidewall of the recess 121. When a distance between two adjacent first ribs 122 is equal to a distance between two adjacent second ribs 123, the shape of the recess 121 is square. When the distance between the two adjacent first ribs 122 is unequal to the distance between the two adjacent second ribs 123, the shape of the recess 121 is rectangular. The length of the rectangular recess 121 may be 0.3 mm, 0.4 mm, 0.45 mm, 0.5 mm, 0.6 mm, etc., which is not limited. The width of the rectangular recess 121 may be 0.3 mm, 0.4 mm, 0.45 mm, 0.5 mm, 0.6 mm, etc., which is not limited.

It may be understood that, near the peripheral edge of the suction portion 12, the shape of the recess 121 is a partial rectangular shape, rather than a complete rectangular shape. This is because the edge of the suction portion 12 intersects with the first ribs 122 and the second ribs 123, thereby dividing the shape of the rectangular shape.

The orthographic projection on the first surface 111 is set to be in the shape of the recess 121, and each of the length and width of the recess 121 is set to range from 0.3 mm to 0.6 mm. Therefore, the recess 121 is simple in shape and reasonable in size, which is convenient for injection molding and also convenient for manufacturing of the mold.

Optionally, the orthographic projection of the recess 121 on the first surface 111 may have another shape other than a rectangular shape, and the dimensions of the length and width of the recess 121 may have other values, which are not limited.

Optionally, as illustrated in FIG. 2 and FIG. 7, a depth of each of the multiple recesses 121 recessed from the first surface 111 ranges from 0.2 mm to 0.3 mm. The depth of the recess 121 may be 0.2 mm, 0.21 mm, 0.22 mm, 0.23 mm, 0.24 mm, 0.25 mm, 0.26 mm, 0.27 mm, 0.28 mm, 0.29 mm, 0.3 mm, etc., which is not limited. Due to the relatively thin thickness of the body 11 of the lower plastic member 10, by setting the recess 121 to have a relatively shallow depth, the suction force between the lower plastic member 10 and the first mold 21 is increased, and the impact of the recess 121 on the strength of the lower plastic member 10.

Optionally, the depth of the recess 121 recessed from the first surface 111 may be other values, which is not limited.

In a specific embodiment, as illustrated in FIG. 2 and FIG. 7, the diameter of the suction portion 12 is 7 mm. The rectangular orthographic projection of the recesses 121 on the first surface 111 has the length of 0.45 mm and the width of 0.45 mm. The depth of the recess 121 recessed from the first surface 111 is 0.25 mm.

By setting each dimension of the above suction portion 12, the suction force between the lower plastic member 10 and the mold can be increased, and the damage to the lower plastic member 10 caused by the bending and deformation of the lower plastic member 10 can be avoided. In addition, the structure is simple, the manufacturing is convenient, and the cost is low. In an embodiment, as illustrated in FIG. 2 and FIG. 7, there are multiple suction portions 12. The multiple suction portions 12 are symmetrical about a midline extending in the width direction of the first surface 111.

The first surface 111 has a first midline A1 extending in the length direction of the lower plastic member 10 and a second midline A2 extending in the width direction of the lower plastic member 10. The multiple suction portions 12 are arranged symmetrically about the second midline A2. The multiple suction portions 12 symmetrically arranged feature a simple layout, thereby facilitating the mold manufacturing and also facilitating visual recognition during the subsequent assembly of the end cover assembly.

Optionally, as illustrated in FIG. 2 and FIG. 7, at least two of the multiple suction portions 12 are disposed on a same side of the midline (that is, the second midline A2) extending in the width direction of the first surface 111, and have different distances from the midline (that is, the second midline A2) extending in the width direction of the first surface 111.

Exemplarily, as illustrated in FIG. 7, there are four suction portions 12. Two suction portions 12 are provided in the vicinity of each of two side edges of the body 11 in the width direction of the body 11. The four suction portions 12 are asymmetrical about the first midline A1, but are symmetrical about the second midline A2. Two suction portions 12 located at the same side of the second midline A2 are disposed in a staggered manner in the second direction Y, that is, there is a spacing distance L between the two suction portions 12 in the first direction X. Optionally, the spacing distance L may range from 3 mm to 3.5 mm, and specifically may be 3 mm, 3.1 mm, 3.2 mm, 3.25 mm, 3.3 mm, 3.4 mm, 3.5 mm, etc., which is not limited.

This arrangement of the multiple suction portions 12 provides a foolproof function for machine vision recognition in automated production lines during the assembly of the end cover assembly, thereby preventing the lower plastic member 10 from being placed incorrectly in a reversed left-right orientation.

In an embodiment, as illustrated in FIG. 2 and FIG. 7, the first surface 111 is provided with a code portion 13. The code portion 13 has a preset shape. The preset shape includes at least one of a number, a letter, a bar code, or a two-dimensional code.

The code portion 13, similar to the suction portion 12 described above, is also a structure left after injection molding. The shape of the code portion 13 may be formed by protruding or being recessed from the first surface 111, and a corresponding shape can be set on the first molding surface 211 of the first mold 21 (as illustrated in FIG. 4 and FIG. 5) in a manner similar to movable type printing, so that the code portion 13 is formed on the lower plastic member 10 after injection molding. The preset shape of the code portion 13 can be set as necessary. For example, the shape of the code portion 13 may be a number, a letter, or the like that can be visually recognized directly with the naked eyes, or may be a bar code, a two-dimensional code, or the like that can be recognized by a terminal equipment scanning the code. By providing the code portion 13, which can be recognized with the naked eye or recognized by scanning the code, the product category, production date, manufacturer name, and other characteristics of the lower plastic member 10 can be obtained, thereby facilitating the traceability of the lower plastic member 10, and the control of the production process and the traceability of quality issues.

Optionally, referring to FIGS. 2 and 7, there are multiple code portions 13 arranged side by side.

Optionally, each of the multiple code portions 13 may be substantially rectangular, the length direction thereof being the first direction X, and the width direction thereof being the second direction Y. The multiple code portions 13 may be sequentially arranged in the second direction Y. Each code portion 13 may have a preset shape, and preset shapes of the multiple code portions 13 may be different from each other. In other words, each code portion 13 can recognize one kind of information, and kinds of information recognized by the multiple code portions 13 are different from each other. The length and width of the multiple code portions 13 are not limited, and may be provided as necessary. For example, as illustrated in FIG. 7, the widths (that is, the dimensions in the second direction Y) of the multiple code portions 13 are substantially equal, and the length (that is, the dimension in the first direction X) of each of some of the multiple code portions 13 is longer than the length of each of the rest of the multiple code portions 13. The multiple code portions 13 having the same length may be provided with both ends aligned or staggered, which is not limited.

During injection molding, multiple replaceable code blocks are provided on the first mold 21. Each code block is replaceable. According to the preset shape corresponding to the information required to be recognized by each lower plastic member 10, a corresponding shape is formed on a corresponding replaceable code block. For example, for the production date information, since the date changes daily, there are multiple replaceable code blocks, and different replaceable code blocks can be replaced according to different dates, so that the code portion 13 of the lower plastic member 10 produced on different dates presents different dates. For other kinds of information, multiple replaceable code blocks may be provided to present different kinds of information.

By arranging the multiple code portions 13 side by side, different pieces of information can be displayed or recognized in one position, which is convenient for tracing various kinds of information.

Optionally, the first surface 111 of the body 11 may be provided with multiple code regions. Each code region is provided with at least one code portion 13. As illustrated in FIG. 7, one code region is provided on each of the left and right sides of the second midline A2 (that is, two opposite sides in the first direction X). Each code region is provided with multiple code portions 13. In structure, the two code regions is symmetrical about the second midline A2. The multiple code regions may be configured to display different kinds of information or the same kind of information, which is not limited.

Optionally, as illustrated in FIG. 2 and FIG. 7, any adjacent two of the multiple code portions 13 are spaced apart from each other. Taking the multiple code portions 13 illustrated in FIG. 7 as an example, the multiple code portions 13 are sequentially arranged in the second direction Y, and there is a gap between any two adjacent code portions 13.

During demolding, after the second mold 22 is separated from the first mold 21 and the lower plastic member 10, the lower plastic member 10 needs to be separated from the first mold 21. The multiple code portions 13 correspond to multiple replaceable code blocks on the first mold 21. By providing a gap between any two adjacent code portions 13, or in other words, between any two adjacent movable code portions, air can enter the gap during demolding. Therefore, the local negative pressure between the replaceable code blocks and the lower plastic member 10 is avoided, the demolding resistance between the lower plastic member 10 and the first mold 21 is reduced, and the production efficiency is improved.

In an embodiment, as illustrated in FIG. 2 and FIG. 3, the lower plastic member 10 further includes a terminal boss 14. The terminal boss 14 is connected to the body 11 and projects from the first surface 111. A snap-fit 15 is provided at each of two sides of the terminal boss 14 in the width direction of the first surface 111.

Specifically, the terminal boss 14 includes a first terminal boss 141 and a second terminal boss 144. Terminals of the end cover assembly include a first terminal (not shown) and a second terminal (not shown), with opposite polarities. The first terminal boss 141 protrudes relative to the first surface 111 and is recessed relative to the second surface 112, to define a first terminal-groove 143. The first terminal boss 141 defines a first terminal-hole 142 extending through the first terminal boss 141 in the third direction Z. The first terminal-hole 142 allows the first terminal to pass through. The first terminal-groove 143 is configured to accommodate a base structure (not shown) of the first terminal. The second terminal boss 144 protrudes relative to the first surface 111 and is recessed relative to the second surface 112, to define a second terminal-groove 146. The second terminal boss 144 defines a second terminal-hole 145 extending through the second terminal boss 144 in the third direction Z. The second terminal-hole 145 allows for the second terminal to pass through. The second pole recess 146 is configured to accommodate a base structure (not shown) of the second terminal. One snap-fit 15 is provided at each of two sides of the first terminal boss 141 in the second direction Y, and one snap-fit 15 is also provided at each of two sides of the second terminal boss 144 in the second direction Y, so that the lower plastic member 10 includes four snap-fits 15 in total, and the four snap-fits 15 are symmetrical about the first midline A1 and the second midline A2. As described in the above embodiments, the terminal boss, the snap-fit 15, and the like, are also formed by injection molding together with the body 11, that is, various structures of the lower plastic member 10 are integrated, which will not be repeatedly described later.

When the lower plastic member 10 is assembled with the upper cover, the first surface 111 of the lower plastic member 10 is positioned facing towards the upper cover, and the upper cover may define a groove for accommodating the terminal boss 14, so that the first surface 111 is in close contact with the upper cover. Additionally, the upper cover may be provided with a snap structure in fit with the snap-fit 15. When the first surface 111 of the lower plastic member 10 is in close contact with the upper cover, the snap-fit 15 is snap-fitted with and fixed to the snap structure, thereby improving the connection stability between the upper cover and the lower plastic member 10.

By providing the snap-fit 15 at each of the two sides of the terminal boss 14 in the second direction Y, the snap-in connection between the lower plastic member 10 and the upper cover can be effected through the snap-fit 15, and the connection stability between the lower plastic member 10 and the upper cover can be improved.

In an embodiment, as illustrated in FIG. 2 and FIG. 3, the snap-fit 15 includes an extension portion 151 and a protrusion 152. The extension portion 151 has one end connected to the first surface 111 and extends in a direction away from the second surface 112. The protrusion 152 is disposed at one another of the extension portion 151 away from the body 11 and protrudes from a surface of the extension portion 151 positioned facing away from the terminal boss 14.

With this structure of the snap-fit 15, the protrusion 152 and the terminal boss 14 are positioned facing away from each other in the second direction Y, allowing for easy snap-in connection between the snap-fit 15 and the upper cover.

Optionally, as illustrated in FIG. 2, an avoidance notch 147 may be defined on each of two opposite side surfaces of the terminal boss 14 in the second direction Y. The avoidance notch 147 can accommodate at least a part of the structure of the snap-fit 15. There is a spacing distance between the snap-fit 15 and an inner wall of the avoidance notch 147. In this way, the space occupied by the snap-fit 15 can be saved, and the function of the terminal boss 14 is not affected. When the snap-fit 15 is snap-fitted with the upper cover, the protrusion 152 of the snap-fit 15 is squeezed, resulting in resilient deformation of a top end of the snap-fit 15 away from the first surface 111 towards the terminal boss. By designing the spacing distance between the snap-fit 15 and the avoidance notch 147, interference between the snap-fit 15 and the terminal boss can be avoided.

Optionally, as illustrated in FIG. 2 and FIG. 7, the lower plastic member 10 further includes a slider portion 16. The slider portion 16 is disposed on the first surface 111 and located at one side of the extension portion 151 positioned facing away from the terminal boss 14. The slider portion 16 is configured to allow a slider to slide on the first surface 111.

The slider portion 16, similar to the suction portion 12 and the code portion 13 described above, is also a structure left on the first surface 111 due to the action of the mold on the first surface 111 during injection molding. In order to mold the snap-fit 15, the first mold 21 is provided with a slider, which is movable in the second direction Y of the lower plastic member 10. During injection molding, the slider is positioned closer to the terminal boss 14. When demolding after the injection molding is completed, if the slider is not moved and the lower plastic member 10 is directly separated from the first mold 21, the interference will occur between the slider and the protrusion 152 of the snap-fit 15, making demolding difficult. As a result, forced demolding may cause the protrusion 152 to be worn down. To prevent this, during demolding, the slider is moved away from the terminal boss 14 in the second direction Y to avoid the protrusion 152 of the snap-fit 15. A mark left on the first surface 111 by sliding of the slider from a position during injection molding to a position during demolding is the slider portion 16.

The slider portion 16 may be a protruding structure or a recessed structure relative to the first surface 111. An orthographic projection of the slider portion 16 on the first surface 111 may be rectangular or any other shape, which is not limited.

By providing the slider portion 16, it is possible to avoid difficulty in demolding or damage to the snap-fit 15 during demolding.

In an implementation, as illustrated in FIG. 2 and FIG. 7, the lower plastic member 10 further includes an annular push portion 171. The annular push portion 171 is disposed on the first surface 111 and surrounds the terminal boss 14. The annular push portion 171 is connected to or spaced apart from the slider portion 16.

As illustrated in FIG. 4 and FIG. 5, the first mold 21 defines a push hole 213 (e.g., an ejector pin hole) extending through the first mold 21 in the thickness direction (that is, the third direction Z) of the lower plastic member 10. During injection molding, the push hole 213 can be blocked by a plunger and other structures to prevent plastic liquid from entering the push hole 213. When injection molding is completed, the plunger is pulled out and the push rod (e.g., an ejector pin) is inserted into the push hole 213 to push the lower plastic member 10 away from the first mold 21. The pressure of the push rod acting on the lower plastic member 10 will leave marks on the lower plastic member 10 after the action of the push rod. The annular push portion 171 in this embodiment is a residual mark after demolding, and various push-point portion in the following description are also residual marks after demolding, all of which are obtained by adopting a relatively high-temperature demolding process.

Due to the relatively complex structure of the terminal boss 14, push rods are adopted to surround the periphery of the terminal boss 14 to press against the first surface 111, to form the annular push portion 171 around the terminal boss. In this way, the force can be uniformly applied to the complex terminal boss 14, thereby ensuring that the terminal boss 14 can be better demolded and avoiding damage.

Due to the need for injection molding of the snap-fit 15, a slider for injection molding needs to be provided at a position corresponding to the slider portion 16. During demolding, the slider needs to be separated along with the lower plastic member 10. Therefore, when the push rod acts on the first surface 111, the push rod cannot be pressed against the slider, but needs to be in contact with or spaced apart from the side surface of the slider. Thus, the remaining annular push portion 171 is connected to or spaced apart from the remaining slider portion 16.

In an implementation, referring to FIG. 2, the lower plastic member 10 further includes multiple first push-point portions 172. The multiple first push-point portions 172 are disposed on the first surface 111 and spaced apart from one another.

The first push-point portion 172 is also a structure left after injection molding, that is, a mark left on the first surface 111 after the push rod acts on the first surface 111. The shape of the first push-point portion 172 may be circular. The diameter of the first push-point portion 172 may range from 4.5 mm to 5 mm, specifically 4.5 mm, 4.6 mm, 4.7 mm, 4.8 mm, 4.9 mm, 5 mm, etc. In a specific embodiment, the diameter of the first push-point portion 172 is 4.85 mm. The first push-point portion 172 may have other shapes and sizes, which are not limited.

By arranging the multiple first push-point portions 172 spaced apart from one another on the first surface 111, the force can be uniformly applied to the first surface 111, thereby facilitating demolding, and preventing the lower plastic member 10 from being damaged due to local uneven stress.

Figure 8:
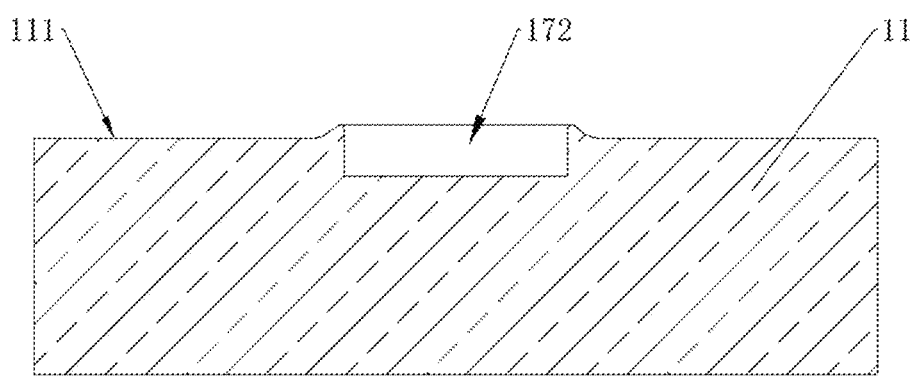
FIG. 8 is a partial cross-sectional view of a lower plastic member according to an embodiment.

Optionally, as illustrated in FIG. 7 and FIG. 8, each of the multiple first push-point portions 172 is crater-shaped. A middle part of each of the multiple first push-point portions 172 is recessed relative to the first surface 111. A peripheral edge of each of the multiple first push-point portions 172 protrudes relative to the first surface 111.

Due to high-temperature demolding, the lower plastic member 10 is not completely cooled to room temperature, and the lower plastic member 10 is relatively soft although solidified and molded. When the push rod acts on the first surface 111, the first surface 111 will be slightly deformed under the pressure of the push rod, thereby forming a crater-shaped structure.

The crater-shape first push-point portion 172 has a recessed depth that is negligible with respect to the thickness of the body 11. The height of the crater-shape first push-point portion 172 protruding relative to the first surface 111 is also negligible with respect to the thickness of the body 11. By providing the first push-point portion 172 having this shape, demolding can be performed at a higher temperature than room temperature, thereby improving production efficiency.

The structure of each subsequent push-point portion is similar to the structure of the first push-point portion 172, each having a crater shape, which will not be repeated later.

Optionally, the multiple first push-point portions 172 are symmetrical about each of the first midline A1 and the second midline A2. In this way, the multiple first push-point portions 172 can apply force to the lower plastic member 10 more uniformly, and the lower plastic member 10 is not easily deformed during demolding.

As illustrated in FIG. 2, FIG. 3, and FIG. 7, the lower plastic member 10 further includes an explosion-proof boss 18. The explosion-proof boss 18 is disposed at a middle part of the body 11 in a length direction of the body 11. The explosion-proof boss 18 is recessed relative to the first surface 111 and protrudes relative to the second surface 112. A bottom wall of the explosion-proof boss 18 recessed from the first surface 111 is a third surface. The third surface 182 defines a vent hole 183 extending through the third surface 182 in the third direction Z. Each of the first surface 111 and the third surface 182 is provided with multiple second push-point portions 173 spaced apart from one another.

The explosion-proof boss 18 is configured to be aligned with an explosion-proof valve disposed on the upper cover. The explosion-proof boss 18 is recessed from the first surface 111, to define a gas collecting chamber. The gas generated by the cell assembly can flow to the gas collecting chamber through the vent hole 183. If the air pressure in the gas collecting chamber is too high, the explosion-proof valve will be triggered to explode and deflate.

The specific structure of the explosion-proof boss 18 may not be limited. The explosion-proof boss 18 may substantially extend in the second direction Y, and may be symmetrical about each of the first midline A1 and the second midline A2. An intersection of the first midline A1 and the second midline A2 is located at the explosion-proof boss 18. The vent hole 183 may be circular, square, arc-shaped, or the like, which is not limited. The vent hole 183 includes multiple smaller holes, so that the explosion-proof boss 18 forms a fence-like structure. Therefore, the explosion-proof boss 18 meets the requirements of structural strength, allows ventilation, and prevents a foreign object on the cell assembly from passing through the vent hole 183 to avoid a short circuit between the foreign object and the upper cover.

The second push-point portion 173 is also a structure left after injection molding, that is, a mark left after the push rod acts on each of the first surface 111 and the third surface 182. The shape of the second push-point portion 173 may be circular. The diameter of the second push-point portion 173 may range from 3 mm to 4 mm, specifically 3 mm, 3.2 mm, 3.4 mm, 3.6 mm, 3.8 mm, 4 mm, etc. The second push-point portion 173 may have other shapes and sizes, which are not limited.

The second push-point portions 173 on the first surface 111 may be located on opposite sides of the suction portion 12 in the first direction X. The push-point portions on the third surface 182 may be located in the intervals between the multiple vent holes 183, or may be located outside the entire set of vent holes 183, which is not limited.

By arranging the multiple second push-point portions 173 spaced apart from one another on each of the first surface 111 and the third surface 182, the force can be uniformly applied to each of the first surface 111 and the third surface 182, thereby facilitating demolding, and preventing the lower plastic member 10 from being damaged due to local uneven stress.

Optionally, the multiple second push-point portions 173 are symmetrical about each of the first midline A1 and the second midline A2. In this way, the multiple second push-point portions 173 can apply force to the lower plastic member 10 more uniformly, and the lower plastic member 10 is not easily deformed during demolding.

In an embodiment, as illustrated in FIG. 2, FIG. 3, and FIG. 7, the explosion-proof boss 18 includes a first boss 181 and two second bosses 184. The first boss 181 is disposed at a middle part of the first surface 111 in a width direction of the first surface 111. Two ends of the first boss 181 in the width direction of the first surface 111 are connected to the two second bosses 184, respectively. A depth of the first boss 181 recessed relative to the first surface 111 is less than a depth of each second boss 184 recessed relative to the first surface 111. Taking the first surface 111 as a reference, the depth of the first boss 181 recessed is shallower, and the depth of the second boss 184 recessed is deeper. Taking the second surface 112 as a reference, the height of the first boss 181 protruding is lower, and the height of the second boss 184 protruding is higher.

With this structure of the explosion-proof boss 18 provided, the first boss 181 having a lower protruding height relative to the second surface 112 is provided between the two second bosses 184. When mounted to the energy storage apparatus, a certain accommodating space can be defined at the first boss 181 between the two second bosses 184, which is convenient to accommodate partial structures such as cell assemblies, thereby fully utilizing space and reducing the size of the energy storage apparatus.

A bottom wall of the first boss 181 is the third surface 182. A bottom wall of the second boss 184 recessed from the first surface 111 is a fourth surface 185. The fourth surface 185 defines multiple air-permeable holes 186 arranged at intervals. The fourth surface 185 is provided with multiple third push-point portions 174 located in the intervals between the multiple air-permeable holes 186.

The air-permeable hole 186 functions similarly to the vent hole 183 described above, and is also used for ventilation. The shape of the vent hole 183 may be circular or other shapes, and the size of the vent hole 183 is not limited.

The third push-point portion 174 is also a structure left after injection molding, that is, a mark left after the push rod acts on the fourth surface 185. The shape of the third push-point portion 174 may be circular. The diameter of the third push-point portion 174 may range from 2 mm to 2.5 mm, specifically 2 mm, 2.1 mm, 2.2 mm, 2.3 mm, 2.4 mm, 2.5 mm, etc. In a specific embodiment, the diameter of the third push-point portion 174 is 2.25 mm. The third push-point portion 174 may have other shapes and sizes, which are not limited.

According to arrangement positions of the multiple air-permeable holes 186, the multiple third push-point portions 174 may be symmetrical about the first midline A1 and the second midline A2, or may be asymmetrical about each of the first midline A1 and the second midline A2, which is not limited. As illustrated in FIG. 7, in order to avoid the air-permeable holes 186, four third push-point portions 174 (that is, two on each of the two second bosses 184) provided on the fourth surface 185 are symmetrical about the first midline A1 and asymmetrical about the second midline A2.

By arranging the multiple third push-point portions 174 at intervals on the fourth surface 185, the force can be uniformly applied to the fourth surface 185, thereby facilitating demolding, and preventing the lower plastic member 10 from being damaged due to local uneven stress.

In an implementation, referring to FIG. 2, FIG. 3, and FIG. 7, the lower plastic member 10 further includes a first recessed platform 191 and a second recessed platform 194. The first recessed platform 191 and the second recessed platform 194 are respectively disposed at two ends of the body 11 in the length direction of the body 11, and are recessed from the first surface 111 and protrude from the second surface 112. By providing the first recessed platform 191 and the second recessed platform 194, a top surface of each of the first recessed platform 191 and the second recessed platform 194 protruding from the second surface 112 can be configured to be in contact with the cell assembly, so that there is a certain space between the body 11 and the cell assembly, thereby facilitating accommodation of structures such as a tab. Therefore, the space utilization rate of the energy storage apparatus is increased and the size of the energy storage apparatus is reduced. As illustrated in FIG. 7, the first recessed platform 191 may further have multiple first reinforcing ribs 197 extending in the first direction X and arranged at intervals in the second direction Y. The second recessed platform 194 may further have multiple second reinforcing ribs 198 extending in the first direction X and arranged at intervals in the second direction Y. Each of the first reinforcing rib 197 and the second reinforcing rib 198 is configured to improve the structural strength of the lower plastic member 10, which is not limited.

A bottom wall of the first recessed platform 191 recessed from the first surface 111 is a fifth surface 192. A bottom wall of the second recessed platform 194 recessed from the first surface 111 is a sixth surface 195. Each of the fifth surface 192 and the sixth surface 195 defines multiple leakage holes arranged at intervals. Each of the fifth surface 192 and the sixth surface 195 is provided with multiple third push-point portions 174 located in the intervals between the multiple leakage holes.

The multiple leakage holes include multiple first leakage holes 193 and multiple second leakage holes 196. The fifth surface 192 defines multiple first leakage holes 193. The sixth surface 195 defines multiple second leakage holes 196. The multiple leakage holes allow electrolyte, which is sprayed onto the first surface 111 during injection, to flow into the cell assembly through injection holes. The multiple leakage holes may be defined at intervals in the second direction Y, and multiple corresponding third push-point portions 174 may be disposed at the intervals between the multiple leakage holes. One third push-point portion 174 may be disposed between two adjacent leakage holes. A third push-point portion 174 may be disposed outside the outermost leakage hole in the second direction Y. There are no limitations on this arrangement.

The multiple third push-point portions 174 disposed on the fifth surface 192 and the sixth surface 195 may be symmetrical about each of the first midline A1 and the second midline A2, or may be asymmetrical about each of the first midline A1 and the second midline A2, which is not limited. As illustrated in FIG. 7, in order to avoid the leakage holes, six third push-point portions 174 provided on the fifth surface 192 and six third push-point portions 174 provided on the sixth surface 195 are asymmetrical about the first midline A1, and symmetrical about the second midline A2.

By arranging the multiple third push-point portions 174 at intervals on each of the fifth surface 192 and the sixth surface 195, the force can be uniformly applied to each of the fifth surface 192 and the sixth surface 195, thereby facilitating demolding, and preventing the lower plastic member 10 from being damaged due to local uneven stress.

As illustrated in FIG. 7, the multiple first push-point portions 172, the multiple second push-point portions 173, and the multiple third push-point portions 174 may be arranged on the lower plastic member 10 as a whole relatively uniformly, so that the lower plastic member 10 as a whole can be stressed relatively uniformly, and the lower plastic member 10 is not easily damaged due to bending and deformation during demolding. For example, the multiple first push-point portions 172 may be evenly arranged around the terminal boss 14, on both sides of the explosion-proof boss 18 opposite to each other in the first direction X, and the like. The multiple second push-point portions 173 may be evenly arranged on both sides of each of the four suction portions 12 opposite to each other in the first direction X, and on the third surface 182. The multiple third push-point portions 174 may be evenly arranged on each of the fourth surface 185, the fifth surface 192, and the sixth surface 195.

Figure 6:
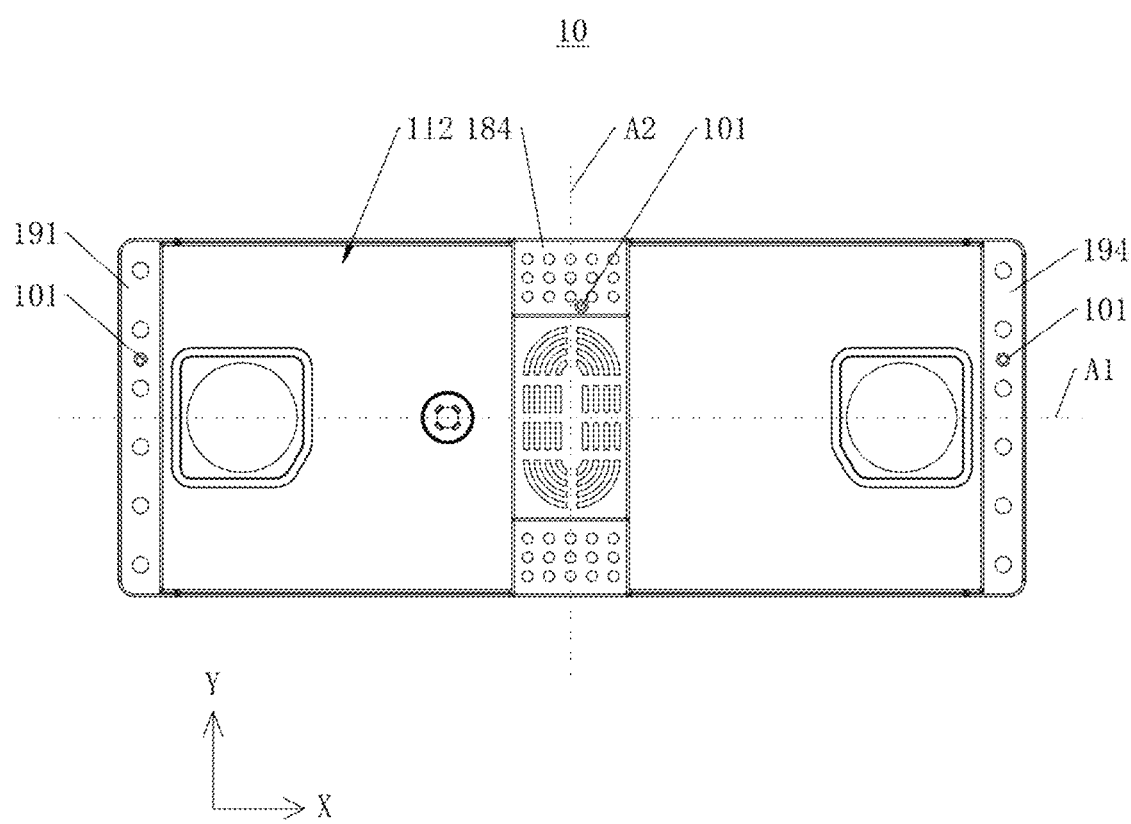
FIG. 6 is a bottom view of a lower plastic member according to an embodiment.

As illustrated in FIG. 3 and FIG. 6, the lower plastic member 10 further includes a gate portion 101. The gate portion 101 is located at one side of the second surface 112 positioned facing away from the first surface 111. The gate portion 101 is residually formed during injection molding of the lower plastic member 10.

As illustrated in FIG. 4 and FIG. 5, the second mold 22 defines a pouring hole 225 extending through the second mold 22 in the third direction Z. The pouring hole 225 is in communication with the mold cavity. The pouring hole 225 allows the plastic liquid to flow, so that the plastic liquid can be injected into the mold cavity. After the plastic liquid is solidified and molded, demolding is performed. After demolding, a pouring mark may remain at a position of the lower plastic member 10 corresponding to the pouring hole 225 to form a gate portion 101. The gate portion 101 may be a protrusion, a groove, or other structures, which is not limited. The shape and size of the gate portion 101 are also not limited.

By forming the gate portion 101 at the side of the second surface 112 positioned facing away from the first surface 111, the first mold 21 is configured for demolding by the push rod, and the second mold 22 is configured for pouring of the plastic liquid, so that the function of the first mold 21 is independent from the function of the second mold 22. Therefore, misoperation, which is easily caused by performing the pouring of the plastic liquid and the demolding by the push rod on the same mold at the same time, can be avoided, and then adverse effects caused by the misoperation can be avoided.

In an embodiment, as illustrated in FIG. 6, a top surface of each of the explosion-proof boss 18, the first recessed platform 191, and the second recessed platform 194, protruding from the second surface 112, is provided with the gate portion 101.

The gate portion 101 on the explosion-proof boss 18 may be disposed on the first boss 181 or the second boss 184, and needs to avoid the vent hole 183 and the air-permeable hole 186. The gate portions 101 disposed on the first recessed platform 191 and the second recessed platform 194 need to avoid the leakage hole.

The number of gate portions 101 may be one or more. When there is one gate portion 101, the gate portions 101 may be disposed on any one of the explosion-proof bosses 18, the first recessed platform 191, and the second recessed platform 194. When there are multiple gate portions 101, the multiple gate portions 101 may be disposed on at least two of the explosion-proof bosses 18, the first recessed platform 191, and the second recessed platform 194. Exemplarily, as illustrated in FIG. 6, each of the explosion-proof boss 18, the first recessed platform 191, and the second recessed platform 194 is provided with one gate portion 101.

By providing the gate portion 101, the injection molding process can be conveniently carried out, the interference with the demolding operation can be avoided, and the product yield can be ensured.

In the description of embodiments of the present disclosure, it should be noted that terms such as "center," "upper," "lower," "left," "right," "vertical," "horizontal," "inner," "outer," and other indicators of orientation or positional relationships are based on the orientation or positional relationships described in the accompanying drawings. These terms are provided merely for the convenience of describing the present disclosure and simplifying the description and are not intended to indicate or imply that the referred apparatus or element must have a specific orientation, be constructed, or operate in a specific orientation. Therefore, these terms cannot be construed as limitations to the present disclosure.

What has been disclosed above is only a preferred embodiment of the present disclosure and cannot be used to limit the scope of the present disclosure. Those of ordinary skill in the art can understand that, all or part of the processes of realizing the above embodiments and the equivalent changes made according to the claims of the present disclosure, still fall within the scope of the present disclosure.

What is claimed is:

1. A lower plastic member for an end cover assembly of an energy storage apparatus, comprising:
   a body, having a first surface and a second surface positioned facing away from the first surface, wherein the first surface is configured to be positioned at one side of the body facing towards an upper cover;
   a suction portion, disposed on the first surface, wherein the suction portion comprises a plurality of first ribs and a plurality of second ribs, the plurality of first ribs are parallel to and spaced apart from one another, the plurality of second ribs are parallel to and spaced apart from one another, the plurality of first ribs and the plurality of second ribs are disposed in a crisscross pattern, the plurality of first ribs and the plurality of second ribs cooperatively define a plurality of recesses, and each of the plurality of recesses is recessed from the first surface towards the second surface and does not extend through the second surface; and an explosion-proof boss, wherein the explosion-proof boss is disposed at a middle part of the body in a length direction of the body, the explosion-proof boss is recessed relative to the first surface and protrudes relative to the second surface, wherein;
the explosion-proof boss is configured to be aligned with an explosion-proof valve disposed on the upper cover;
a midline extending in a width direction of the first surface is corresponding to the explosion-proof boss, and there is a spacing distance between the suction portion and the explosion-proof boss;
an end surface of the plurality of first ribs configured to be positioned facing towards the upper cover is flush with the first surface, and an end surface of the plurality of second ribs configured to be positioned facing towards the upper cover is flush with the first surface;
the suction portion is configured for attachment of the lower plastic member to a mold, and an orthographic projection of the suction portion on the first surface is circular and has a diameter ranging from 5 mm to 10 mm; an orthographic projection of each of the plurality of recesses on the first surface is rectangular, and has a length ranging from 0.3 mm to 0.6 mm and a width ranging from 0.3 mm to 0.6 mm; and a depth of each of the plurality of recesses recessed from the first surface ranges from 0.2 mm to 0.3 mm; and
wherein the suction portion is implemented as a plurality of suction portions, and the plurality of suction portions are symmetrical about the midline extending in the width direction of the first surface.

2. The lower plastic member of claim 1, wherein an end portion of each of the plurality of first ribs and the plurality of second ribs, configured to be positioned facing towards the upper cover, has a pointed-prism shape.

3. The lower plastic member of claim 1, wherein at least two of the plurality of suction portions are disposed on a same side of the midline extending in the width direction of the first surface, and have different distances from the midline extending in the width direction of the first surface.

4. The lower plastic member of claim 1, wherein the first surface is provided with a code portion, the code portion has a preset shape, and the preset shape comprises at least one of a number, a letter, a bar code, or a two-dimensional code.

5. The lower plastic member of claim 4, wherein the code portion is implemented as a plurality of code portions arranged side by side.

6. The lower plastic member of claim 5, wherein any adjacent two of the plurality of code portions are spaced apart from each other.

7. The lower plastic member of claim 1, further comprising a terminal boss, wherein the terminal boss is connected to the body and protrudes from the first surface, and a snap-fit is provided at each of the two sides of the terminal boss in the width direction of the first surface.

8. The lower plastic member of claim 7, wherein the snap-fit comprises an extension portion and a protrusion, the extension portion has one end connected to the first surface and extends in a direction away from the second surface, and the protrusion is disposed at another end of the extension portion away from the body and protrudes from a surface of the extension portion positioned facing away from the terminal boss.

9. The lower plastic member of claim 8, further comprising a slider portion, wherein the slider portion is disposed on the first surface and located at one side of the extension portion positioned facing away from the terminal boss, and the slider portion is configured to allow a slider to slide on the first surface.

10. The lower plastic member of claim 9, further comprising an annular push portion, wherein the annular push portion is disposed on the first surface and surrounds the terminal boss, and the annular push portion is connected to or spaced apart from the slider portion.

11. The lower plastic member of claim 1, further comprising a plurality of first push-point portions, wherein the plurality of first push-point portions are disposed on the first surface and spaced apart from one another.

12. The lower plastic member of claim 11, wherein a bottom wall of the explosion-proof boss recessed from the first surface is a third surface, the third surface defines a vent hole, and each of the first surface and the third surface is provided with a plurality of second push-point portions spaced apart from one another.

13. The lower plastic member of claim 12, wherein a midline extending in a length direction of the first surface is a first midline, and the midline extending in the width direction of the first surface is a second midline; and the plurality of first push-point portions are symmetrical about each of the first midline and the second midline, and/or the plurality of second push-point portions are symmetrical about each of the first midline and the second midline.

14. The lower plastic member of claim 12, wherein the explosion-proof boss comprises a first boss and two second bosses, the first boss is disposed at a middle part of the first surface in the width direction of the first surface, two ends of the first boss in the width direction of the first surface are connected to the two second bosses, respectively, a depth of the first boss recessed relative to the first surface is less than a depth of each second boss recessed relative to the first surface, a bottom wall of the first boss is the third surface, a bottom wall of the second boss recessed from the first surface is a fourth surface, the fourth surface defines a plurality of air-permeable holes arranged at intervals, and the fourth surface is provided with a plurality of third push-point portions located in the intervals between the plurality of air-permeable holes.

15. The lower plastic member of claim 14, further comprising a first recessed platform and a second recessed platform, wherein the first recessed platform and the second recessed platform are respectively disposed at two ends of the body in the length direction of the body, and are recessed from the first surface and protrude from the second surface, a bottom wall of the first recessed platform recessed from the first surface is a fifth surface, a bottom wall of the second recessed platform recessed from the first surface is a sixth surface, each of the fifth surface and the sixth surface defines a plurality of leakage holes arranged at intervals, and each of the fifth surface and the sixth surface is provided with a plurality of third push-point portions located in the intervals between the plurality of leakage holes.

16. The lower plastic member of claim 11, wherein each of the plurality of first push-point portions is crater-shaped, a middle part of each of the plurality of first push-point portions is recessed relative to the first surface, and a peripheral edge of each of the plurality of first push-point portions protrudes relative to the first surface.

17. The lower plastic member of claim 1, further comprising a gate portion, wherein the gate portion is located at one side of the second surface positioned facing away from the first surface, and the gate portion is residually formed during injection molding of the lower plastic member.

18. The lower plastic member of claim 17, further comprising a first recessed platform, and a second recessed platform, wherein the explosion-proof boss is disposed at a middle part of the body in the length direction of the body, the first recessed platform and the second recessed platform are respectively disposed at two ends of the body in the length direction of the body, each of the explosion-proof boss, the first recessed platform, and the second recessed platform is recessed from the first surface and protrudes from the second surface, and a top surface of each of the explosion-proof boss, the first recessed platform, and the second recessed platform, protruding from the second surface, is provided with the gate portion.

19. An end cover assembly comprising:
an upper cover and a lower plastic member, wherein the lower plastic member comprises:
  a body, having a first surface and a second surface positioned facing away from the first surface, wherein the first surface of the lower plastic member is positioned facing towards the upper cover;
  a suction portion, disposed on the first surface, wherein the suction portion comprises a plurality of first ribs and a plurality of second ribs, the plurality of first ribs are parallel to and spaced apart from one another, the plurality of second ribs are parallel to and spaced apart from one another, the plurality of first ribs and the plurality of second ribs are disposed in a crisscross pattern, the plurality of first ribs and the plurality of second ribs cooperatively define a plurality of recesses, and each of the plurality of recesses is recessed from the first surface towards the second surface and does not extend through the second surface; and
  an explosion-proof boss, wherein the explosion-proof boss is disposed at a middle part of the body in a length direction of the body, the explosion-proof boss is recessed relative to the first surface and protrudes relative to the second surface;
wherein the explosion-proof boss is aligned with an explosion-proof valve disposed on the upper cover;
wherein a midline extending in a width direction of the first surface is corresponding to the explosion-proof boss, and there is a spacing distance between the suction portion and the explosion-proof boss;
wherein an end surface of the plurality of first ribs positioned facing towards the upper cover is flush with the first surface, and an end surface of the plurality of second ribs positioned facing towards the upper cover is flush with the first surface;
wherein the suction portion is configured for attachment of the lower plastic member to a mold, and an orthographic projection of the suction portion on the first surface is circular and has a diameter ranging from 5 mm to 10 mm; an orthographic projection of each of the plurality of recesses on the first surface is rectangular, and has a length ranging from 0.3 mm to 0.6 mm and a width ranging from 0.3 mm to 0.6 mm; and a depth of each of the plurality of recesses recessed from the first surface ranges from 0.2 mm to 0.3 mm; and
wherein the suction portion is implemented as a plurality of suction portions, and the plurality of suction portions are symmetrical about the midline extending in the width direction of the first surface.

20. A power consuming device comprising:
a power consuming apparatus and an energy storage apparatus, wherein the energy storage apparatus is configured to supply power to the power consuming apparatus, and the energy storage apparatus comprises a housing, a cell assembly, and an end cover assembly, wherein the cell assembly is disposed in the housing, and the end cover assembly is connected to the housing; and the end cover assembly comprises an upper cover and a lower plastic member, wherein the lower plastic member comprises:
  a body, having a first surface and a second surface positioned facing away from the first surface, wherein the first surface of the lower plastic member is positioned facing towards the upper cover;
  a suction portion, disposed on the first surface, wherein the suction portion comprises a plurality of first ribs and a plurality of second ribs, the plurality of first ribs are parallel to and spaced apart from one another, the plurality of second ribs are parallel to and spaced apart from one another, the plurality of first ribs and the plurality of second ribs are disposed in a crisscross pattern, the plurality of first ribs and the plurality of second ribs cooperatively define a plurality of recesses, and each of the plurality of recesses is recessed from the first surface towards the second surface and does not extend through the second surface; and
  an explosion-proof boss, wherein the explosion-proof boss is disposed at a middle part of the body in a length direction of the body, the explosion-proof boss is recessed relative to the first surface and protrudes relative to the second surface;
wherein the explosion-proof boss is aligned with an explosion-proof valve disposed on the upper cover;
wherein a midline extending in a width direction of the first surface is corresponding to the explosion-proof boss, and there is a spacing distance between the suction portion and the explosion-proof boss;
wherein an end surface of the plurality of first ribs positioned facing towards the upper cover is flush with the first surface, and an end surface of the plurality of second ribs positioned facing towards the upper cover is flush with the first surface;
wherein the suction portion is configured for attachment of the lower plastic member to a mold, and an orthographic projection of the suction portion on the first surface is circular and has a diameter ranging from 5 mm to 10 mm; an orthographic projection of each of the plurality of recesses on the first surface is rectangular, and has a length ranging from 0.3 mm to 0.6 mm and a width ranging from 0.3 mm to 0.6 mm; and a depth of each of the plurality of recesses recessed from the first surface ranges from 0.2 mm to 0.3 mm; and
wherein the suction portion is implemented as a plurality of suction portions, and the plurality of suction portions are symmetrical about the midline extending in the width direction of the first surface.

* * * * *